(12) United States Patent
Sekiguchi

(10) Patent No.: US 11,035,677 B2
(45) Date of Patent: Jun. 15, 2021

(54) ROUTE INFORMATION CONVERSION SYSTEM, ROUTE INFORMATION TRANSMISSION APPARATUS, AND ROUTE INFORMATION RECEPTION APPARATUS

(71) Applicant: CLARION CO., LTD., Saitama (JP)

(72) Inventor: Takaaki Sekiguchi, Tokyo (JP)

(73) Assignee: CLARION CO., LTD., Saitama (JP)

(*) Notice: Subject to any disclaimer, the term of this patent is extended or adjusted under 35 U.S.C. 154(b) by 57 days.

(21) Appl. No.: 16/308,541

(22) PCT Filed: May 8, 2017

(86) PCT No.: PCT/JP2017/017401
§ 371 (c)(1),
(2) Date: Dec. 10, 2018

(87) PCT Pub. No.: WO2017/217136
PCT Pub. Date: Dec. 21, 2017

(65) Prior Publication Data
US 2019/0162544 A1 May 30, 2019

(30) Foreign Application Priority Data
Jun. 14, 2016 (JP) .............................. JP2016-117676

(51) Int. Cl.
*G01C 21/30* (2006.01)
*G09B 29/10* (2006.01)
(Continued)

(52) U.S. Cl.
CPC ............. *G01C 21/30* (2013.01); *G01C 21/26* (2013.01); *G01C 21/34* (2013.01);
(Continued)

(58) Field of Classification Search
CPC .... G01C 21/32; G01C 21/34; G01C 21/3694; G01C 21/30; G09B 29/10
See application file for complete search history.

(56) References Cited

U.S. PATENT DOCUMENTS

2004/0085227 A1 5/2004 Mikuriya et al.
2006/0184322 A1 8/2006 Kim
(Continued)

FOREIGN PATENT DOCUMENTS

JP 2004-157172 A 6/2004
JP 2006-350089 A 12/2006
(Continued)

OTHER PUBLICATIONS

International Search Report of PCT/JP2017/017401 dated Aug. 8, 2017.
(Continued)

*Primary Examiner* — Kenneth J Malkowski
(74) *Attorney, Agent, or Firm* — Mattingly & Malur, PC

(57) ABSTRACT

A route information conversion system includes a route information transmission apparatus and a route information reception apparatus. The route information transmission apparatus includes: a route search unit that generates a search result of a route with reference to first map data; a position reference information generation unit that generates position reference information indicating a road corresponding to the search result; and a peripheral road information generation unit that generates peripheral road information indicating a road branching from the road corresponding to the search result. The route information reception apparatus includes: a route information restoration unit that restores route information on second map data from the position reference information; and a route match determination unit that determines whether the search result on the first map
(Continued)

data and the route information on the second map data match each other with reference to the peripheral road information.

11 Claims, 24 Drawing Sheets

(51) Int. Cl.
 *G01C 21/26* (2006.01)
 *G01C 21/34* (2006.01)
 *G01C 21/36* (2006.01)
(52) U.S. Cl.
 CPC ..... *G01C 21/3614* (2013.01); *G01C 21/3691* (2013.01); *G09B 29/10* (2013.01)

(56) References Cited

U.S. PATENT DOCUMENTS

| | | | | |
|---|---|---|---|---|
| 2006/0241858 | A1* | 10/2006 | Adachi | G08G 1/0969 701/408 |
| 2010/0332132 | A1 | 12/2010 | Okude et al. | |
| 2012/0128214 | A1 | 5/2012 | Satoh | |
| 2012/0128217 | A1 | 5/2012 | Satoh | |

FOREIGN PATENT DOCUMENTS

| | | |
|---|---|---|
| JP | 2012-145450 A | 8/2012 |
| JP | 2012-189382 A | 10/2012 |

OTHER PUBLICATIONS

Extended European Search Report received in corresponding European Application No. 17813041.5 dated Dec. 19, 2019.

Japanese Office Action received in corresponding Japanese Application No. 2016-117676 dated Oct. 15, 2019.

* cited by examiner

FIG. 4
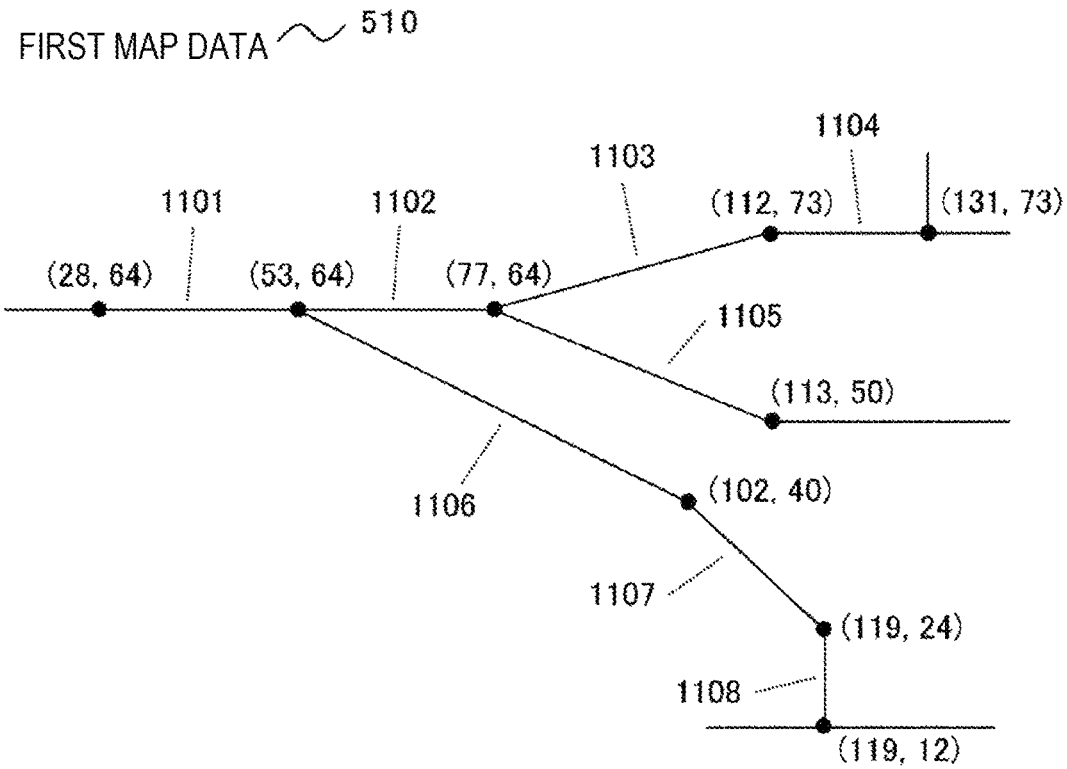
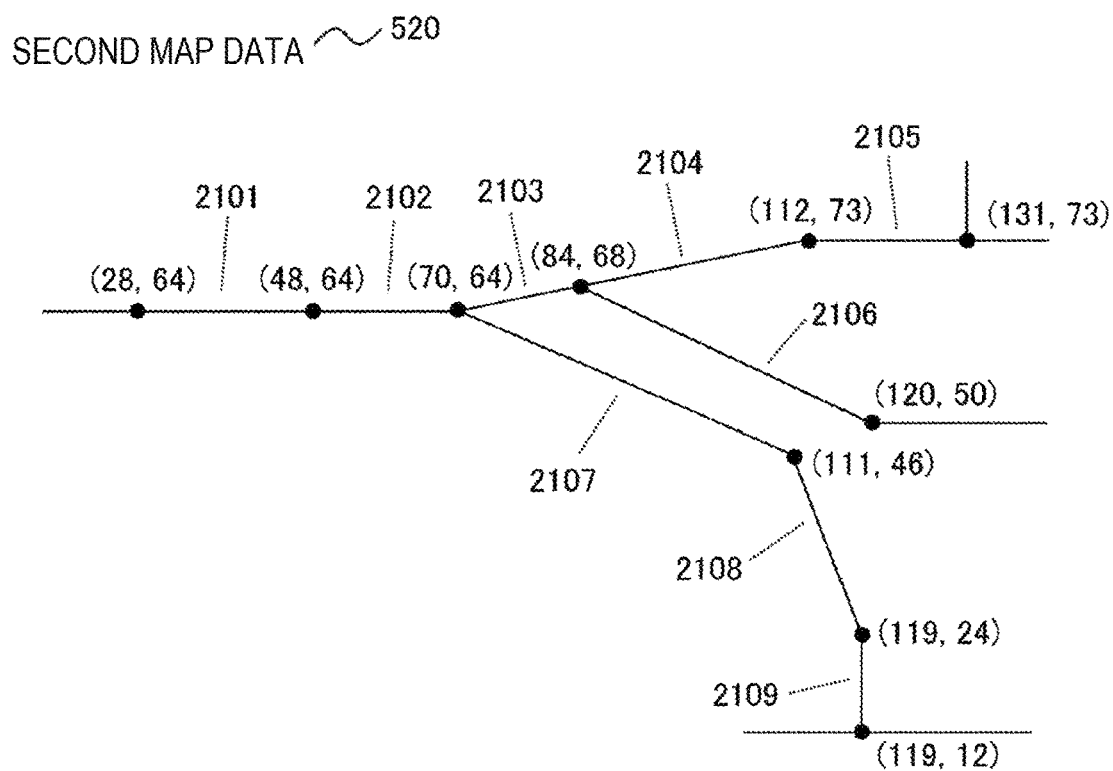

FIG. 5

FIRST MAP DATA ~ 510

| LINK ID | START POINT | | END POINT | | ATTRIBUTE |
|---|---|---|---|---|---|
| | X COORDINATE | Y COORDINATE | X COORDINATE | Y COORDINATE | |
| 1101 | 28 | 64 | 53 | 64 | NATIONAL HIGHWAY |
| 1102 | 53 | 64 | 77 | 64 | NATIONAL HIGHWAY |
| 1103 | 77 | 64 | 112 | 73 | NATIONAL HIGHWAY |
| 1104 | 112 | 73 | 131 | 73 | NATIONAL HIGHWAY |
| 1105 | 77 | 64 | 113 | 50 | PREFECTURAL HIGHWAY |
| 1106 | 53 | 64 | 102 | 40 | PREFECTURAL HIGHWAY |
| 1107 | 102 | 40 | 119 | 24 | PREFECTURAL HIGHWAY |
| 1108 | 119 | 24 | 119 | 12 | PREFECTURAL HIGHWAY |
| : | : | : | : | : | : |

SECOND MAP DATA ~ 520

| LINK ID | START POINT | | END POINT | | ATTRIBUTE |
|---|---|---|---|---|---|
| | X COORDINATE | Y COORDINATE | X COORDINATE | Y COORDINATE | |
| 2101 | 28 | 64 | 48 | 64 | NATIONAL HIGHWAY |
| 2102 | 48 | 64 | 70 | 64 | NATIONAL HIGHWAY |
| 2103 | 70 | 64 | 84 | 68 | NATIONAL HIGHWAY |
| 2104 | 84 | 68 | 112 | 73 | NATIONAL HIGHWAY |
| 2105 | 112 | 73 | 131 | 73 | NATIONAL HIGHWAY |
| 2106 | 84 | 68 | 120 | 50 | PREFECTURAL HIGHWAY |
| 2107 | 70 | 64 | 111 | 46 | PREFECTURAL HIGHWAY |
| 2108 | 111 | 46 | 119 | 24 | PREFECTURAL HIGHWAY |
| 2109 | 119 | 24 | 119 | 12 | PREFECTURAL HIGHWAY |
| : | : | : | : | : | : |

| BRANCH ID | X COORDINATE | Y COORDINATE | ATTRIBUTE |
|---|---|---|---|
| 1106 | 53 | 64 | PREFECTURAL HIGHWAY |
| 1106 | 102 | 40 | PREFECTURAL HIGHWAY |
| 1106 | 119 | 24 | PREFECTURAL HIGHWAY |
| 1106 | 119 | 12 | – |

(BRANCH ROAD A)

| BRANCH ID | X COORDINATE | Y COORDINATE | ATTRIBUTE |
|---|---|---|---|
| 1103 | 77 | 64 | NATIONAL HIGHWAY |
| 1103 | 112 | 73 | NATIONAL HIGHWAY |
| 1103 | 131 | 73 | – |

(BRANCH ROAD B)

5501 5502 5503 5504

| BRANCH ID | X COORDINATE | Y COORDINATE | ATTRIBUTE |
|---|---|---|---|
| 1106 | 119 | 24 | PREFECTURAL HIGHWAY |
| 1106 | 119 | 12 | — |

BRANCH ROAD A 5501, 5502, 5503, 5504

| BRANCH ID | X COORDINATE | Y COORDINATE | ATTRIBUTE |
|---|---|---|---|
| 1103 | 112 | 73 | NATIONAL HIGHWAY |
| 1103 | 131 | 73 | — |

BRANCH ROAD B

FIG. 14

BASED ON POSITION REFERENCE INFORMATION

| NUMBER | X COORDINATE (X1) | Y COORDINATE (Y1) | ATTRIBUTE (A1) |
|---|---|---|---|
| 1 | 28 | 64 | 1 |
| 2 | 53 | 64 | 1 |
| 3 | 77 | 64 | 2 |

ATTRIBUTE: 1=NATIONAL HIGHWAY, 2=PREFECTURAL HIGHWAY

BASED ON SECOND MAP DATA

| LINK ID | X COORDINATE (X2) | Y COORDINATE (Y2) | ATTRIBUTE (A2) |
|---|---|---|---|
| 2101 | 28 | 64 | 1 |
| 2102 | 48 | 64 | 1 |
| 2103 | 70 | 64 | 1 |
| 2104 | 84 | 68 | 1 |
| 2105 | 112 | 73 | 1 |
| 2106 | 84 | 68 | 2 |
| 2107 | 70 | 64 | 2 |
| 2108 | 111 | 46 | 2 |
| 2109 | 119 | 24 | 2 |
| ⋮ | ⋮ | ⋮ | ⋮ |

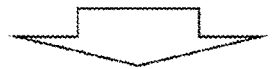

SIMILARITY CALCULATION RESULT

| LINK ID | POSITION 1 | | POSITION 2 | | POSITION 3 | |
|---|---|---|---|---|---|---|
| | DIFFERENCE | RANK | DIFFERENCE | RANK | DIFFERENCE | RANK |
| 2101 | 0 | 1 | 625 | – | 1275 | – |
| 2102 | 500 | – | 125 | 1 | 775 | – |
| 2103 | 1050 | – | 425 | 2 | 225 | 3 |
| 2104 | 1403 | – | 781 | – | 251 | 4 |
| 2105 | 2112 | – | 1492 | – | 953 | – |
| 2106 | 1453 | – | 831 | – | 201 | 2 |
| 2107 | 1100 | – | 475 | 3 | 175 | 1 |
| 2108 | 2173 | – | 1568 | – | 961 | – |
| 2109 | 2535 | – | 1979 | – | 1450 | – |
| ⋮ | ⋮ | ⋮ | | | | |

DIFFERENCE = $W1 \times \sqrt{(X1 - X2)^2 + (Y1 - Y2)^2} + W2 \times |A1 - A2|$  (W1 = 25, W2 = 50)

| | LINK ID (5601) | X COORDINATE (5602) | Y COORDINATE (5603) | ATTRIBUTE (5604) | DETERMINATION RESULT (5605) |
|---|---|---|---|---|---|
| ROUTE START POINT | 2101 | 28 | 64 | PREFECTURAL HIGHWAY | MATCH |
| | 2102 | 48 | 64 | PREFECTURAL HIGHWAY | MATCH |
| | 2103 | 70 | 64 | PREFECTURAL HIGHWAY | BRANCH POSITION NON-MATCH |
| | 2106 | 84 | 68 | PREFECTURAL HIGHWAY | BRANCH POSITION NON-MATCH |
| ROUTE END POINT | — | 120 | 50 | — | — |

ROUTE INFORMATION CONVERSION SYSTEM, ROUTE INFORMATION TRANSMISSION APPARATUS, AND ROUTE INFORMATION RECEPTION APPARATUS

TECHNICAL FIELD

The present invention relates to a route information conversion system, a route information transmission apparatus, and a route information reception apparatus.

BACKGROUND ART

When a route is accurately indicated on digital map data (hereinafter, map data), it is necessary to indicate the route on the basis of links and nodes constituting a road network since there is a difference in coordinates of a road depending on the map data to be used. For example, a route connecting certain two points is indicated as an array of IDs (link IDs) of links corresponding to the route. In general, however, different values are used for the link ID depending on the map data, information on a route created using certain map data has no meaning on different map data. Thus, a technique for transmitting route information between devices using different map data has been devised, and has been put to practical use so far in distribution of road traffic information and congestion information with respect to car navigation systems.

In regard to the above-described problem, a technique described in PTL 1 is known. PTL 1 discloses a road estimation device that estimates a road by receiving data of a core point assigned along the road and having an attribute to specify the road from the outside and extracting a link on a map corresponding to the road indicated by the core point. In the road estimation device, a search area for the core point is set, a link inside the search area is extracted assuming that there is a plurality of roads parallel to the road indicated by the core point, and parallel road information is used. As a result, a link corresponding to the road indicated by the core point is appropriately extracted even if there is a plurality of links parallel to map data.

CITATION LIST

Patent Literature

PTL 1: JP 2012-189382 A

SUMMARY OF INVENTION

Technical Problem

Even if coordinates and attributes of certain links are similar between different types of map data, these links actually correspond to different roads in some cases. For example, there is a case where nodes existing at almost the same coordinates in both pieces of map data actually correspond to different branch points at a complex intersection where a plurality of branch points is densely arranged at extremely short intervals. In such a case, for a link constituting a route on one map data, if a link having similar coordinates and attributes is simply selected as the link indicating the same road in the other map data, there is a problem that an incorrect link is selected so that it is difficult to transmit the route correctly. In the technique described in PTL 1, however, it is difficult to select a correct link in such a case.

The present invention has been made in view of the above circumstances, and a main object thereof is to correctly transmit information on a route between different types of map data.

Solution to Problem

A route information conversion system according to the present invention includes a route information transmission apparatus and a route information reception apparatus. The route information transmission apparatus includes: a route search unit that generates a search result of a route with reference to first map data; a position reference information generation unit that generates position reference information indicating a road corresponding to the search result; and a peripheral road information generation unit that generates peripheral road information indicating a road branching from the road corresponding to the search result. The route information reception apparatus includes: a route information restoration unit that restores route information on second map data from the position reference information; and a route match determination unit that determines whether the search result on the first map data and the route information on the second map data match each other with reference to the peripheral road information.

A route information transmission apparatus according to the present invention, connected to a route information reception apparatus via a communication network, includes: a route search unit that generates a search result of a route with reference to first map data; a position reference information generation unit that generates position reference information indicating a road corresponding to the search result; a peripheral road information generation unit that generates peripheral road information indicating a road branching from the road corresponding to the search result; and a communication unit that transmits the position reference information and the peripheral road information to the route information reception apparatus.

A route information reception apparatus according to the present invention, connected to a route information transmission apparatus via a communication network, includes: a communication unit that receives position reference information indicating a search result of a route in first map data and peripheral road information indicating a road branching from the route from the route information transmission apparatus; a route information restoration unit that restores route information on second map data from the position reference information; and a route match determination unit that determines whether the search result on the first map data and the route information on the second map data match each other with reference to the peripheral road information.

Advantageous Effects of Invention

According to the present invention, it is possible to correctly transmit the route information between different types of map data.

BRIEF DESCRIPTION OF DRAWINGS

FIG. 4 is a view illustrating roads represented by first and second map data.

FIG. 5 is a table exemplifying configurations of the first and second map data.

FIG. 14 is an explanatory view of a candidate link selection process in the route information restoration unit.

DESCRIPTION OF EMBODIMENTS

Hereinafter, embodiments of the present invention will be described with reference to the drawings.

First Embodiment

Hereinafter, a route information conversion system according to a first embodiment of the present invention will be described with reference to FIGS. 1 to 20. In the following first embodiment, a description will be given regarding an example in which the route information conversion system according to the present invention is applied to a navigation-cooperative autonomous driving system of a vehicle, and a route of an autonomous vehicle is set using a car navigation system mounted on the vehicle. That is, the car navigation system creates the route of the vehicle using map data for navigation in the first embodiment. On the other hand, an electrical control unit (ECU) that controls the vehicle refers to map data for autonomous driving, which is different from the navigation map data, to perform autonomous driving in accordance with a route created by the car navigation system. As a result, information on the route can be transmitted correctly even if the map data to be used differs between the car navigation system and the ECU for vehicle control in the navigation-cooperative autonomous driving system.

Figure 1:
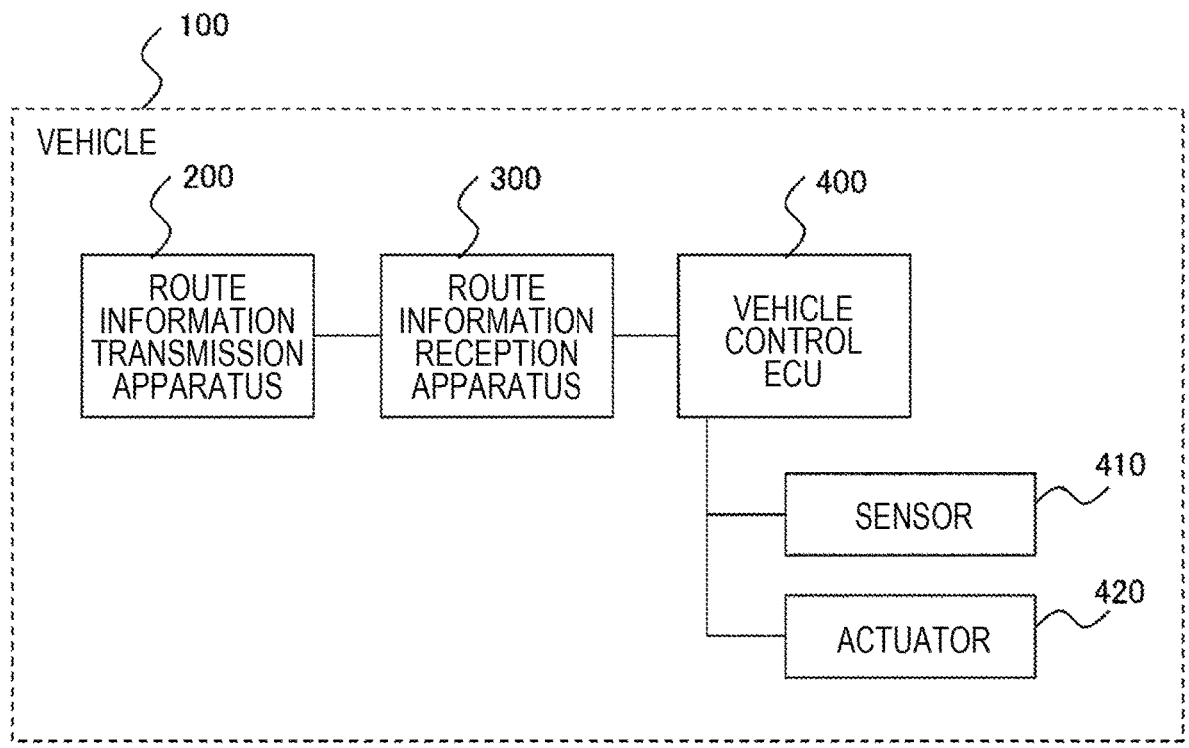
FIG. 1 is an overall configuration diagram of a navigation-cooperative autonomous driving system according to a first embodiment of the present invention.

FIG. 1 is an overall configuration diagram of the navigation-cooperative autonomous driving system according to the first embodiment of the present invention. The navigation-cooperative autonomous driving system illustrated in FIG. 1 is mounted on a vehicle 100, and includes a route information transmission apparatus 200, a route information reception apparatus 300, a vehicle control ECU 400, a sensor 410, and an actuator 420.

The route information transmission apparatus 200 corresponds to the car navigation system, and is connected to the route information reception apparatus 300 via a communication network such as a controller area network (CAN) provided in the vehicle 100. The route information transmission apparatus 200 has map data for navigation, generates a route along which the vehicle 100 needs to travel using the map data, and transmits information on the generated route to the route information reception apparatus 300. Incidentally, details of the route information transmission apparatus 200 will be described later with reference to FIG. 2.

The route information reception apparatus 300 is connected to each of the route information transmission apparatus 200 and the vehicle control ECU 400 via a communication network such as a CAN. The route information reception apparatus 300 has another map data for autonomous driving, different from the above-described navigation map data, converts a route indicated by the information received from the route information transmission apparatus 200 into a route for autonomous driving using this map data, and transmits information on the route to the vehicle control ECU 400. Incidentally, details of the route information reception apparatus 300 will be described later with reference to FIG. 3.

The vehicle control ECU 400 controls the sensor 410 and the actuator 420 while referring to the route indicated by the information received from the route information reception apparatus 300, thereby performing autonomous driving of the vehicle 100 in accordance with the route. The sensor 410 performs measurement necessary for autonomous driving of the vehicle 100 and outputs a result of the measurement to the vehicle control ECU 400, and is configured using, for example, an image sensor or the like. The actuator 420 performs an operation necessary for autonomous driving of the vehicle 100 according to the control of the vehicle control ECU 400, and is configured using, for example, a steering device, a brake device, or the like.

Incidentally, the route information transmission apparatus 200 and the route information reception apparatus 300 are configured as separate apparatuses, in the configuration of FIG. 1, but the route information conversion system according to the present invention is not limited to such a configuration, and the route information transmission apparatus 200 and the route information reception apparatus 300 may be integrated as a single apparatus. In addition, transmission and reception of information between the route information transmission apparatus 200 and the route information reception apparatus 300 may be performed directly without intervention of a communication network or performed by wireless communication or the like, and may be performed via a shared memory or the like.

Figure 2:
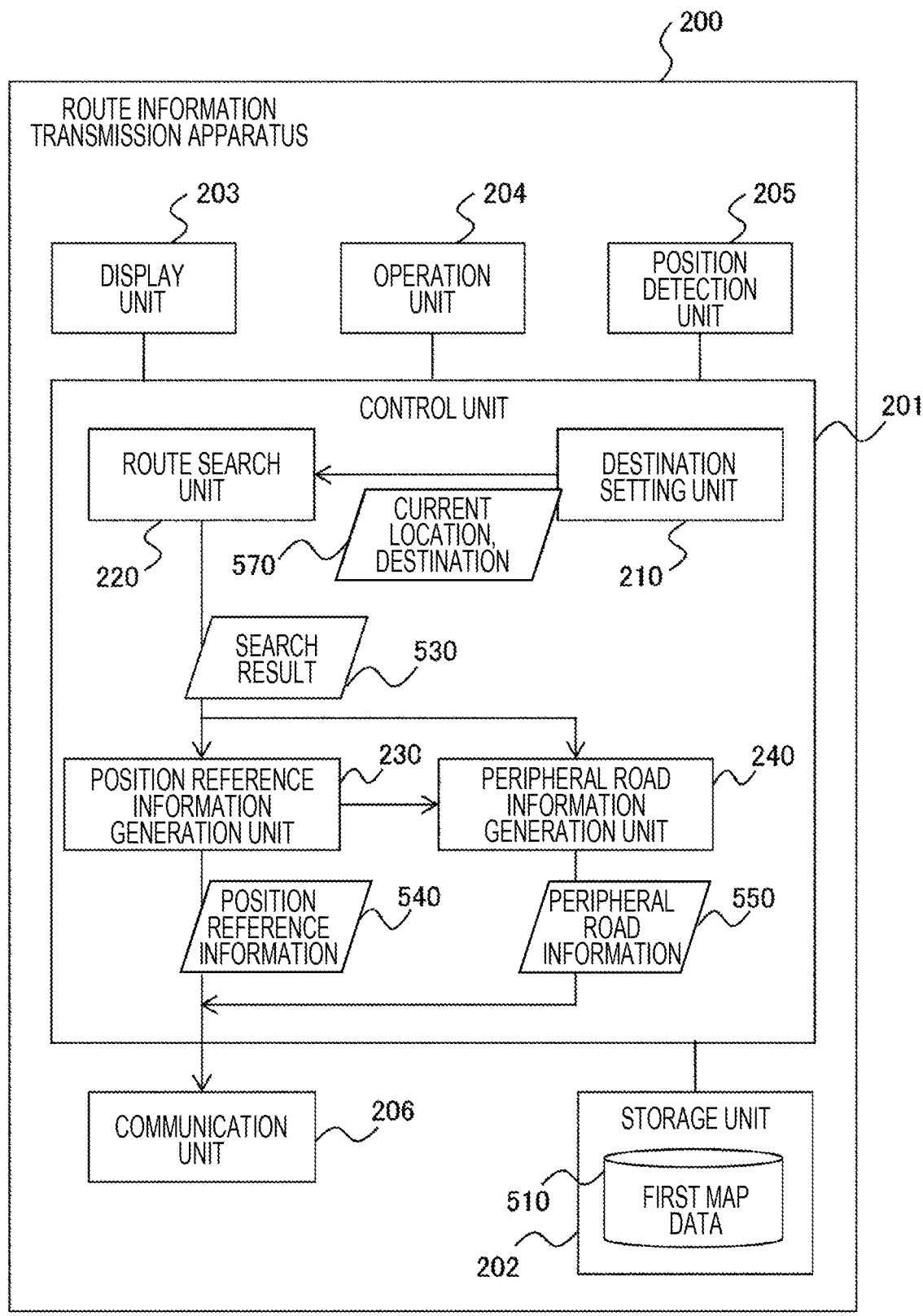
FIG. 2 is a configuration diagram of a route information transmission apparatus according to the first embodiment.

FIG. 2 is a configuration diagram of the route information transmission apparatus 200. The route information transmission apparatus 200 includes a control unit 201, a storage unit 202, a display unit 203, an operation unit 204, a position detection unit 205, and a communication unit 206. The storage unit 202 stores first map data 510 which is the navigation map data.

The control unit 201 performs a series of processes of the route information transmission apparatus 200 serving as the car navigation system, and is constituted by a CPU, a ROM, a RAM, and the like. The control unit 201 has functional blocks of a destination setting unit 210, a route search unit 220, a position reference information generation unit 230, and a peripheral road information generation unit 240. These functional blocks are functions to be realized as software modules as the CPU executes predetermined programs. Alternatively, these functional blocks may be realized as dedicated hardware.

The destination setting unit 210 sets a destination of a route along which the vehicle 100 needs to travel in response to a user's input operation via the operation unit 204. In addition, the destination setting unit 210 sets a current location, which serves as a start point of the route, based on a current position of the vehicle 100 detected by the position detection unit 205. Information indicating the current location and the destination set by the destination setting unit 210 is output to the route search unit 220 as route search information 570.

The route search unit 220 refers to the first map data 510 stored in the storage unit 202 based on the route search information 570 input from the destination setting unit 210 to generate a search result 530 of a route along which the vehicle 100 needs to travel from the current location to the destination. The search result 530 generated by the route search unit 220 is output to the position reference information generation unit 230 and the peripheral road information generation unit 240.

The position reference information generation unit 230 generates position reference information 540 indicating a road indicating a searched route, that is, a road corresponding to the search result 530 based on the search result 530 input from the route search unit 220. Incidentally, details of a method of generating the position reference information 540 will be described later. The position reference information 540 generated by the position reference information generation unit 230 is output to the peripheral road information generation unit 240 and the communication unit 206.

The peripheral road information generation unit 240 generates peripheral road information 550 indicating a road branching from the searched route, that is, a road branching from the road corresponding to the search result 530 based on the search result 530 input from the route search unit 220 and the position reference information 540 input from the position reference information generation unit 230. Incidentally, details of a method of generating the peripheral road information 550 will be described later. The peripheral road information 550 generated by the peripheral road information generation unit 240 is output to the communication unit 206.

The display unit 203 displays various types of information including the first map data 510. The operation unit 204 receives various operations of a user including a destination setting operation for setting of a destination of a route along which the vehicle 100 needs to travel. The display unit 203 and the operation unit 204 are configured using, for example, a touch panel type liquid crystal display or the like. The position detection unit 205 detects the current position of the vehicle 100, and is configured using, for example, a GPS sensor. Information on the destination set by the user's operation on the operation unit 204 and information on the current position detected by the position detection unit 205 are output to the destination setting unit 210, and used for generation of the route search information 570 in the destination setting unit 210.

The communication unit 206 communicates with the route information reception apparatus 300 via a communication network such as a CAN. The position reference information 540 generated by the position reference information generation unit 230 and the peripheral road information 550 generated by the peripheral road information generation unit 240 are transmitted from the route information transmission apparatus 200 to the route information reception apparatus 300 through the communication performed by the communication unit 206.

Figure 3:
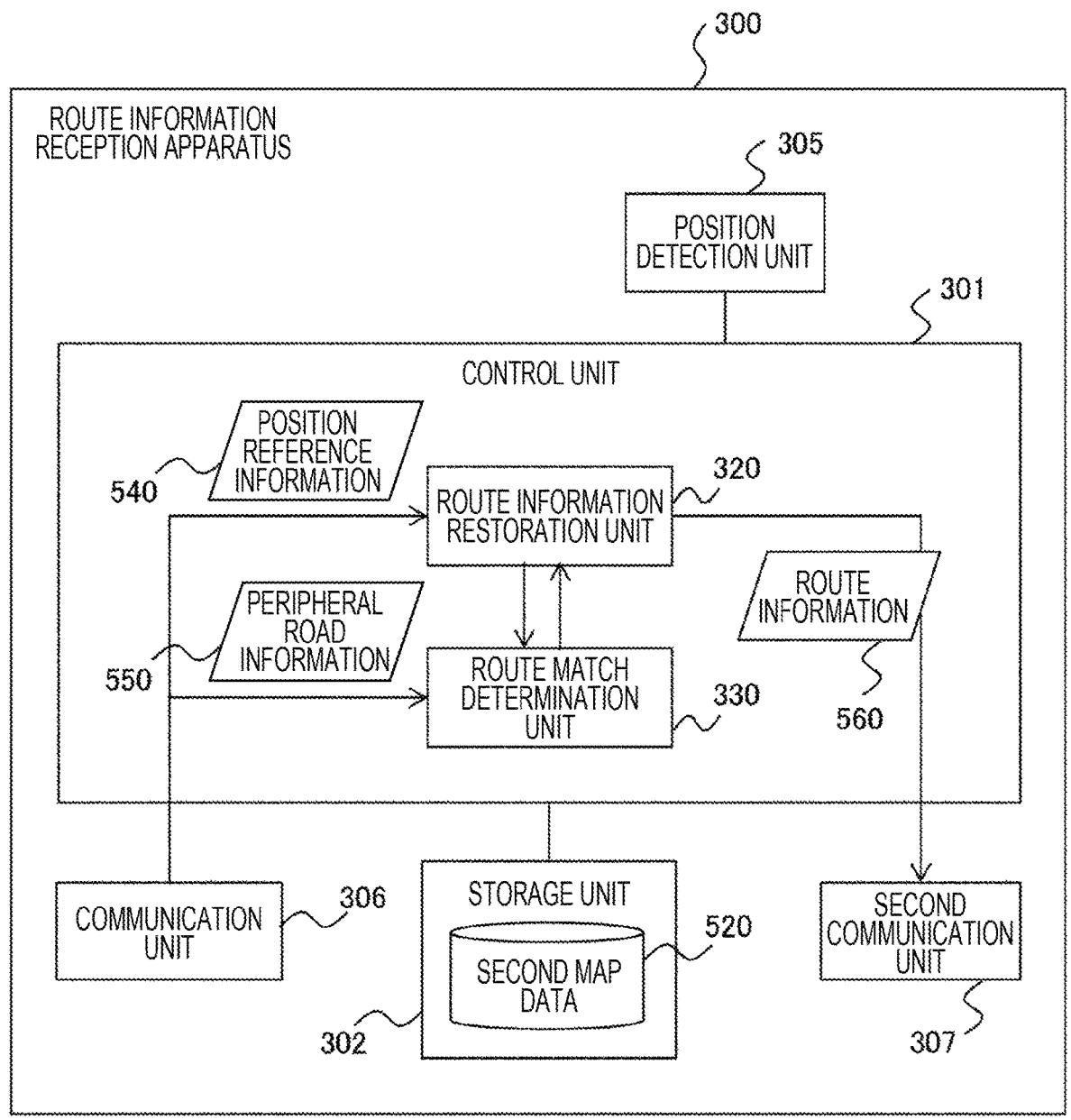
FIG. 3 is a configuration diagram of a route information reception apparatus according to the first embodiment.

FIG. 3 is a configuration diagram of the route information reception apparatus 300. The route information reception apparatus 300 includes a control unit 301, a storage unit 302, a position detection unit 305, a communication unit 306, and a second communication unit 307. The storage unit 302 stores second map data 520 which is the autonomous driving map data.

The control unit 301 performs a series of processes of the route information reception apparatus 300 for generation of a route for autonomous driving, and is constituted by a CPU, a ROM, a RAM, and the like. The control unit 301 has functional blocks of a route information restoration unit 320 and a route match determination unit 330. These functional blocks are functions to be realized as software modules as the CPU executes predetermined programs. Alternatively, these functional blocks may be realized as dedicated hardware.

The route information restoration unit 320 restores route information 560 indicating a route of the vehicle 100 on the second map data 520 from the position reference information 540 transmitted from the route information transmission apparatus 200. Incidentally, details of a method of restoring the route information 560 will be described later. The route information 560 restored by the route information restoration unit 320 is output to the second communication unit 307.

The route match determination unit 330 refers to the peripheral road information 550 transmitted from the route information transmission apparatus 200 to determine whether the search result of the route on the first map data 510 indicated by the position reference information 540 and the route information 560 on the second map data 520 restored by the route information restoration unit 320 match each other. Incidentally, details of a route match determination method performed by the route match determination unit 330 will be described later.

The position detection unit 305 detects a current position of the vehicle 100 using the second map data 520. The communication unit 306 communicates with the route information transmission apparatus 200 via a communication network such as a CAN. The position reference information 540 and the peripheral road information 550 transmitted from the route information transmission apparatus 200 are received by the route information reception apparatus 300 through the communication performed by the communication unit 306. The second communication unit 307 communicates with the vehicle control ECU 400 via a communication network such as a CAN. The route information 560 restored by the route information restoration unit 320 is transmitted from the route information reception apparatus 300 to the vehicle control ECU 400 through the communication performed by the second communication unit 307.

FIG. 4 is a view exemplifying roads indicated, respectively, by the first map data 510 referred to by the route information transmission apparatus 200 and the second map data 520 referred to by the route information reception apparatus 300. In FIG. 4, a line indicates a link and a point indicates a node. In addition, a combination of numerical values ("(28, 64)" or the like) in parentheses adjacent to each node indicates an X coordinate and a Y coordinate of each node, and a numerical value (such as "1101") indicated by a drawn broken line at each link indicates a link ID assigned to each link. Hereinafter, a description will be given using coordinates of each node as an identifier of each node and the link ID of each link as an identifier of each link.

In FIG. 4, a road between a node (28, 64) and a node (131, 73) is constituted by four links 1101, 1102, 1103, and 1104 in the first map data 510, and is constituted by five links 2101, 2102, 2103, 2104, and 2105 in the second map data 520. In addition, coordinates of each node at both end points of these links are slightly different from each other and not the same. Further, coordinates of each node at both end points of each link constituting a road branching from the above-described road also differ between the first map data 510 and the second map data 520. In this manner, both the first map data 510 and the second map data 520 indicate the road in the same place, but there are slight differences in configuration of road network (node coordinates, link connection relations, or the like).

FIG. 5 is a view illustrating configuration examples of the first map data 510 and the second map data 520 illustrated in FIG. 4. As illustrated in FIG. 5, the first map data 510 is constituted by each column of a link ID 5101, a start point X coordinate 5102, a start point Y coordinate 5103, an end point X coordinate 5104, an end point Y coordinate 5105, and an attribute 5106. A link ID of each link constituting the road in the first map data 510 is stored in each field of the link ID 5101. An X coordinate and a Y coordinate of a node constituting a start point of each link in the first map data 510 are stored in each field of the start point X coordinate 5102 and the start point Y coordinate 5103. An X coordinate and a Y coordinate of a node constituting an end point of each link in the first map data 510 are stored in each field of the end point X coordinate 5104 and the end point Y coordinate 5105. A type of a road represented by each link, for example, is stored as an attribute of each link on the first map data 510 in each field of the attribute 5106.

The second map data 520 also has the same configuration as the first map data 510 as illustrated in FIG. 5, and is constituted by each column of a link ID 5201, a start point X coordinate 5202, a start point Y coordinate 5203, an end point X coordinate 5204, an end point Y coordinate 5205, and an attribute 5206. A link ID of each link constituting the road in the second map data 520 is stored in each field of the link ID 5201. An X coordinate and a Y coordinate of a node constituting a start point of each link in the second map data 520 are stored in each field of the start point X coordinate 5202 and the start point Y coordinate 5203. An X coordinate and a Y coordinate of a node constituting an end point of each link in the second map data 520 are stored in each field of the end point X coordinate 5204 and the end point Y coordinate 5205. A type of a road represented by each link, for example, is stored as an attribute of each link on the second map data 520 in each field of the attribute 5206.

Incidentally, there is a case where the same X and Y coordinates do not indicate the same node in general map data such as a road on the ground and an overpass passing over the road, but it is assumed that the same coordinates indicate the same node in the present embodiment. For example, both coordinates of an end point node of the link 1101 in the first map data 510 and coordinates of a start point node of the link 1102 are (53, 64). That is, this case means that the end point of the link 1101 and the start point of the link 1102 are connected.

The configuration of the navigation-cooperative autonomous driving system according to the present embodiment has been described as above. Hereinafter, the present embodiment will be described along flow of operations of the present system.

Figure 6:
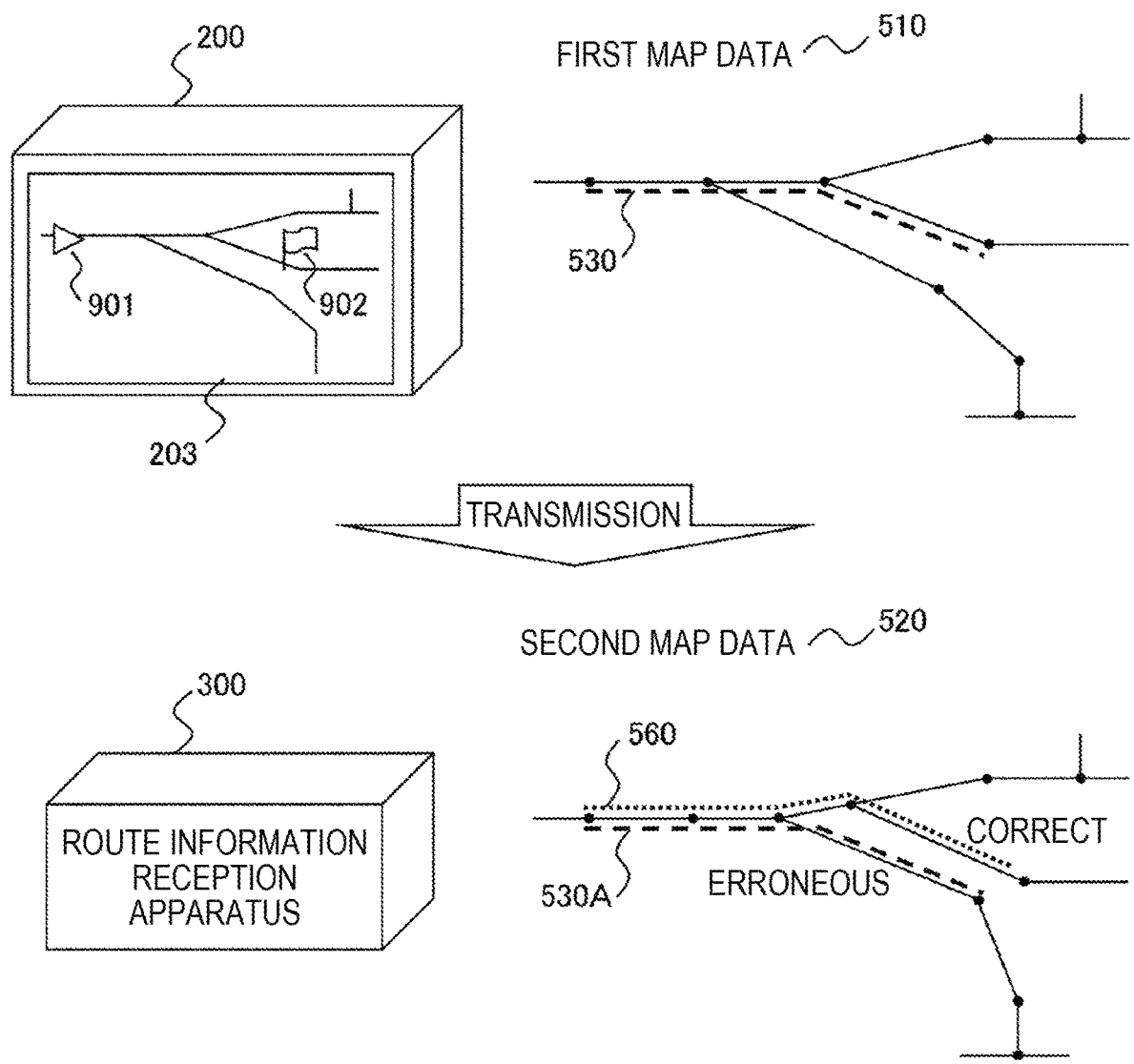
FIG. 6 is a view for describing an operation outline of the navigation-cooperative autonomous driving system according to the first embodiment.

FIG. 6 is a view for describing an operation outline of the navigation-cooperative autonomous driving system according to the present embodiment. As illustrated in the upper left part of FIG. 6, a current location 901 and a destination 902 are displayed on the road represented by the first map data 510 on the display unit 203 of the route information transmission apparatus 200. When a route from the current location 901 to the destination 902 is searched for, the search result 530 on the first map data 510 is generated in the route information transmission apparatus 200 as illustrated in the upper right part, and the position reference information 540 corresponding to the search result 530 and the peripheral road information 550 are transmitted from the route information transmission apparatus 200 to the route information reception apparatus 300.

When receiving the position reference information 540 and the peripheral road information 550 from the route information transmission apparatus 200, the route information reception apparatus 300 selects a road corresponding to the search result 530 in the second map data 520 as illustrated in the lower right part of FIG. 6 in order to perform autonomous driving along the route indicated by the search result 530. Here, there is a case where a route 530A on the second map data 520 is selected when a road whose attributes and road coordinates are the most similar to the search result 530 is simply selected. However, since the search result 530 on the first map data 510 and the route 530A on the second map data 520 are different roads as understood from FIG. 6, the above-described selection becomes an error. Thus, the search result 530 is converted into the route information 560 by a means to be described hereinafter in the present embodiment. As the route information 560 from the route information transmission apparatus 200 is transmitted to the vehicle control ECU 400, the autonomous driving of the vehicle 100 is performed along the correct route indicated by the route information 560.

Hereinafter, an operation of the route information transmission apparatus 200 will be described first between the route information transmission apparatus 200 and the route information reception apparatus 300 in the navigation-cooperative autonomous driving system according to the present embodiment with reference to FIGS. 7 to 12.

Figure 7:
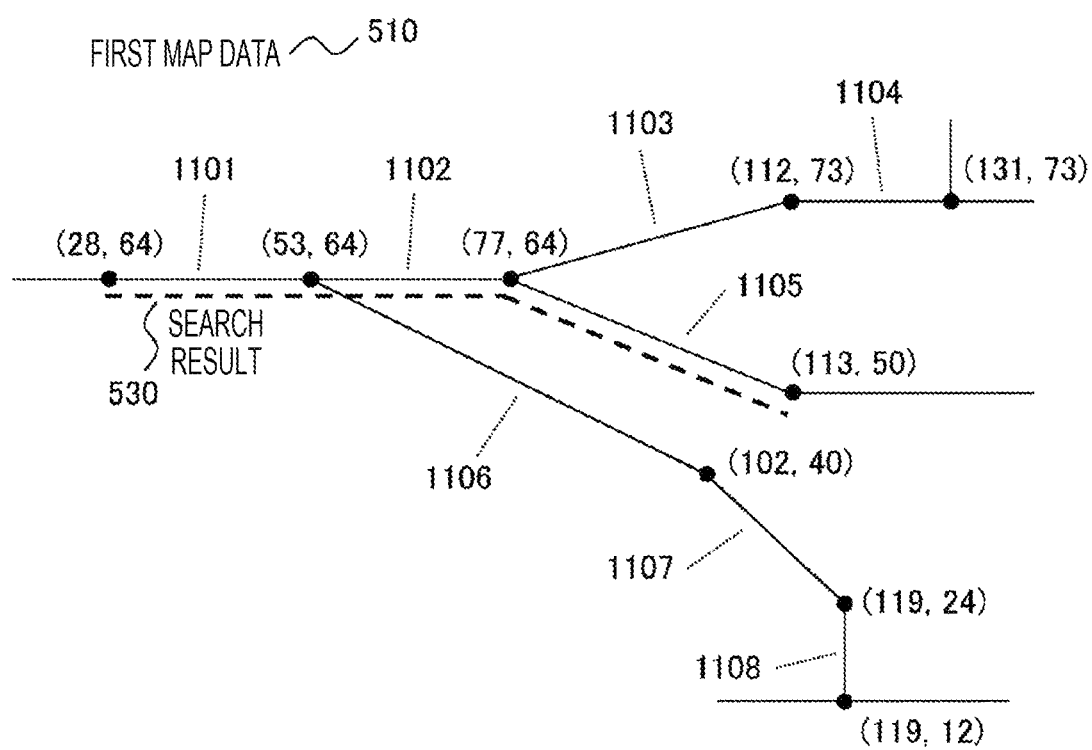
FIG. 7 is a view exemplifying a configuration of a search result and a corresponding road.

FIG. 7 is a view illustrating a configuration of the above-described search result 530 exemplified in FIG. 6 and a corresponding road in the first map data 510. As illustrated in the upper table of FIG. 7, the search result 530 is constituted by a number 5301 and a link ID 5302. Each field of the number 5301 indicates the order of a series of links to be used until reaching a route end point from a route start point, and each field of the link ID 5302 indicates a link ID of each link constituting the route. The lower view of FIG. 7 illustrates any road (link) in the first map data 510 that the search result 530 corresponds to. That is, the lower view illustrates that the route reaching the destination 902 from the current location 901 passes sequentially through the links 1101, 1102, and 1105 in the first map data 510.

Figure 8:
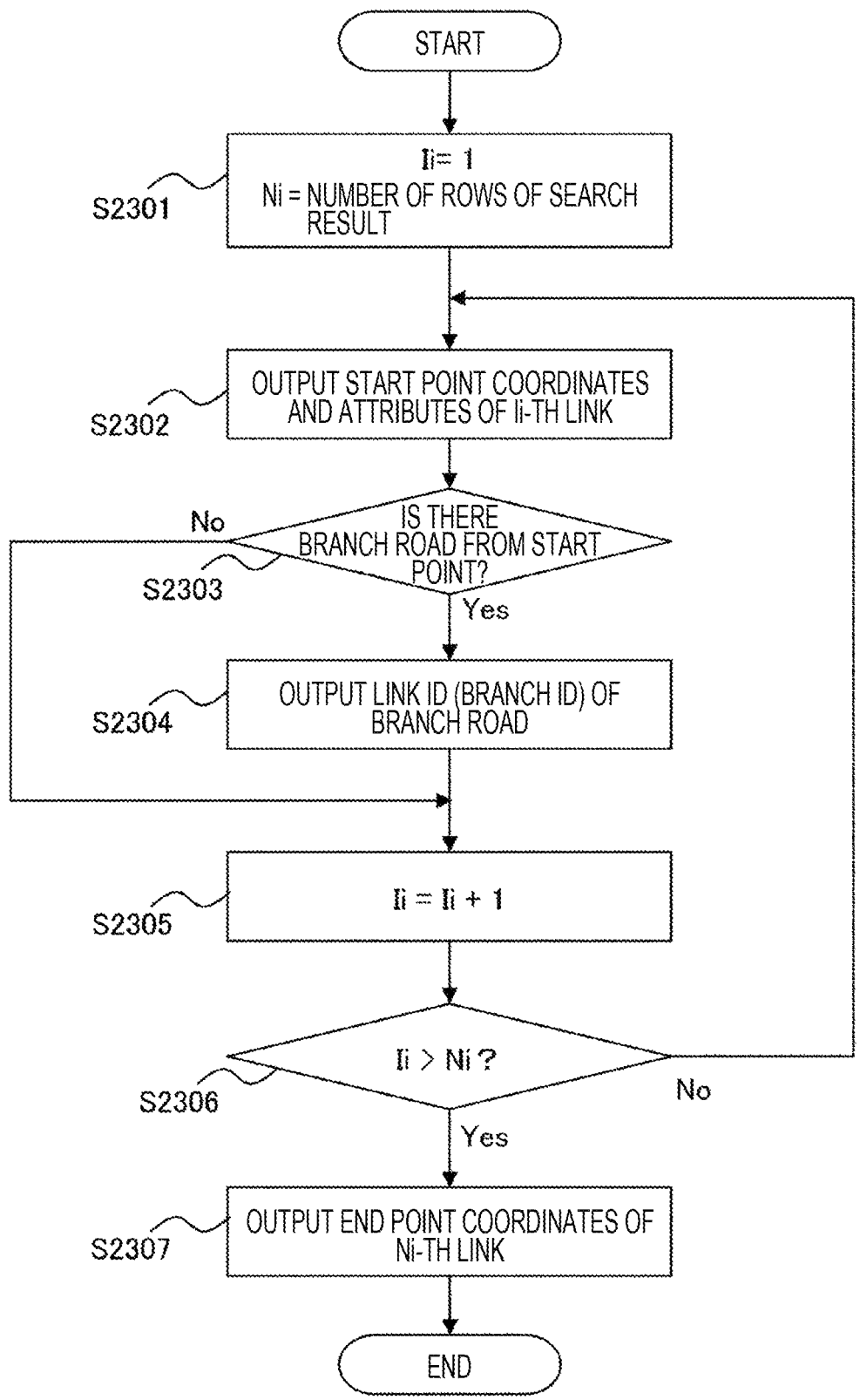
FIG. 8 is a flowchart exemplifying a process of a position reference information generation unit.

FIG. 8 is a flowchart illustrating an operation of the position reference information generation unit 230, which is executed to generate the position reference information 540 using the search result 530. The processing illustrated in this flowchart is executed when the search result 530 is input from the route search unit 220 in the position reference information generation unit 230.

First, the position reference information generation unit 230 sets one as an initial value to a variable Ii and sets the number of rows of the search result 530 to a variable Ni (step S2301). Since the number of rows of the search result 530 is three in the example illustrated in FIG. 7, three is set to the variable Ni.

Next, the position reference information generation unit 230 refers to the first map data 510 to select a link of a row (hereinafter referred to as an Ii-th link) corresponding to the current value of the variable Ii in the search result 530 input from the route search unit 220, and outputs start point coordinates and attributes of the link (step S2302).

Next, the position reference information generation unit 230 determines whether a branch road is present at the start point of the Ii-th link selected in step S2302 (step S2303). The branch road referred to herein is a road branching from the start point of the Ii-th link, which is a road different from the route, that is, a road not included in the search result 530. As a result, if the branch road is present, a link ID of the branch road (hereinafter referred to as a branch ID) is output with reference to the first map data 510 (step S2304). After outputting the branch ID in step S2304, the position reference information generation unit 230 then adds one to the variable Ii (step S2305). On the other hand, if no branch road is present, the processing proceeds to step S2305 without outputting the branch ID, and one is added to the variable Ii.

Next, the position reference information generation unit 230 compares a value of the variable Ii obtained by adding one in step S2305 with a value of the variable Ni set in step S2301, and determines whether the variable Ii has reached a value exceeding the variable Ni (step S2306). As a result, if the variable Ii does not exceed the variable Ni, the processing returns to step S2302, and the processes of step S2302 and the subsequent steps are repeated. On the other hand, when the variable Ii exceeds the variable Ni, end point coordinates of the Ni-th link are output (step S2307). After executing step S2307, the position reference information generation unit 230 ends the processing illustrated in the flowchart of FIG. 8.

The position reference information generation unit 230 can output the start point coordinates and attributes of each link indicating the route in the search result 530, input from the route search unit 220, and the end point coordinates of the route by executing the above-described processing. In addition, the link ID of the branch road can also be output when the branch road is present. As a result, it is possible to generate the position reference information 540 accurately indicating the route corresponding to the search result 530 on the first map data 510 by summarizing these pieces of information.

Figure 9:
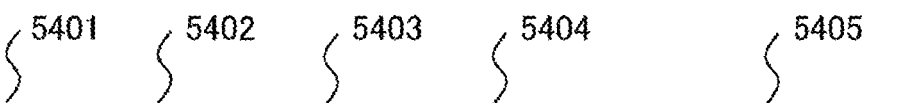
FIG. 9 is a table exemplifying a configuration of position reference information.

FIG. 9 is a view illustrating a configuration example of the position reference information 540 generated by the above processing. As illustrated in FIG. 9, the position reference information 540 includes a number 5401, an X coordinate 5402, a Y coordinate 5403, an attribute 5404, and a branch ID 5405. Each field of the number 5401 indicates the order of each of nodes through which a series of links from a route start point to a route end point passes. An X coordinate and a Y coordinate of each of these nodes in the first map data 510 are stored in each field of the X coordinate 5402 and the Y coordinate 5403. An attribute of a link having each node as a start point in the first map data 510 is stored in each field of the attribute 5404. When a branch road from each node is present, the link ID of the link corresponding to the branch road is stored in each field of the branch ID 5405.

Figure 10:
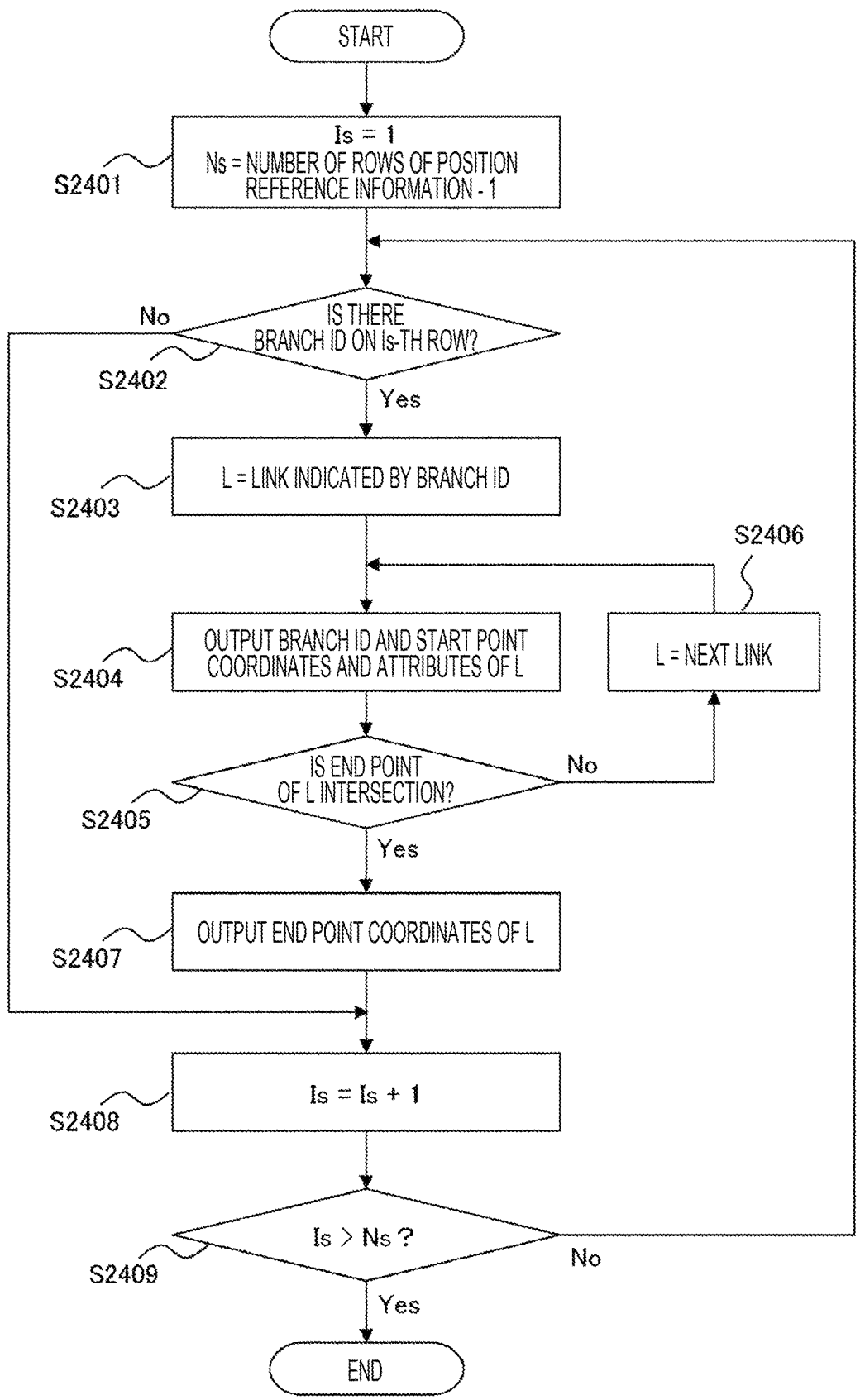
FIG. 10 is a flowchart exemplifying a process of a peripheral road information generation unit.

FIG. 10 is a flowchart illustrating an operation of the peripheral road information generation unit 240, which is executed to generate the peripheral road information 550 using the search result 530 and the position reference information 540. The processing illustrated in this flowchart is executed in the peripheral road information generation unit 240 when the search result 530 is input from the route search unit 220 and the position reference information 540 is input from the position reference information generation unit 230.

The peripheral road information generation unit 240 first sets a value of one as an initial value to a variable Is and a value obtained by subtracting one from the number of rows of the position reference information 540 to a variable Ns (step S2401). Since the number of rows of the position reference information 540 is four in the example illustrated in FIG. 9, three is set to the variable Ns.

Next, the peripheral road information generation unit 240 refers to a row corresponding to the current value of the variable Is in the position reference information 540 input from the position reference information generation unit 230 to determine whether a link ID indicating a branch road is stored in a field of the branch ID 5405 of the row (step S2402). As a result, the processing proceeds to step S2403 if the link ID of the branch road is stored, and the processing proceeds to step S2408 if the link ID of the branch road is not stored.

When the processing proceeds to step S2403, the peripheral road information generation unit 240 sets a link indicated by the link ID of the branch road confirmed in step S2402 as a link L to be processed in the subsequent process (step S2403). Next, the peripheral road information generation unit 240 refers to the first map data 510 to output the link ID of the branch road confirmed in step S2402, an X coordinate and a Y coordinate of a start point of the link L set in step S2403, and an attribute of the link L (step S2404).

Next, the peripheral road information generation unit 240 determines whether an end point of the link L is an intersection (step S2405). Here, the determination in step S2405 is performed by determining whether there are two or more other links connected to the end point of the link L, that is, whether the link L is a junction of three or more roads with reference to the first map data 510. As a result, if it is determined that the end point of the link L is not the intersection, that is, if only one link is connected next to the link L, the link is newly set as the link L to be processed (step S2406), and the processing returns to step S2404. On the other hand, if it is determined that the end point of the link L is the intersection, that is, if two or more links are connected next to the link L, coordinates of the end point of the link L are output (step S2407), and the processing proceeds to step S2408. Incidentally, when no other link is connected to the end point of the link L, that is, when the end point of the link L is a dead end, the processing may proceed to step S2408 after executing step S2407, which is similar to the case where it is determined that the end point of the link L is the intersection.

When it is determined in step S2402 that the link ID of the branch road is not stored, or when the end point coordinates of the link L are output in step S2407, the peripheral road information generation unit 240 adds one to the variable Is (step S2408).

Next, the peripheral road information generation unit 240 compares a value of the variable Is to which one has been added in step S2408 with a value of the variable Ns set in step S2401 to determine whether the variable Is exceeds the variable Ns (step S2409). As a result, if the variable Is does not exceed the variable Ns, the processing returns to the step S2402, and the processes of the step S2402 and the subsequent steps are repeated. On the other hand, if the variable Is exceeds the variable Ns, the processing illustrated in the flowchart of FIG. 10 is ended.

When there is a branch road branching from the route in the search result 530 input from the route search unit 220, the peripheral road information generation unit 240 can output start point coordinates and attributes of each link on the branch road and end point coordinates at which the branch road is connected to another road by executing the above-described processing. As a result, it is possible to set the road, which branches from the route corresponding to the search result 530 on the first map data 510 and extends to the intersection with another road different from the route as a branch road, and generate the peripheral road information 550 accurately indicating the branch road by summarizing these pieces of information.

Figure 11:
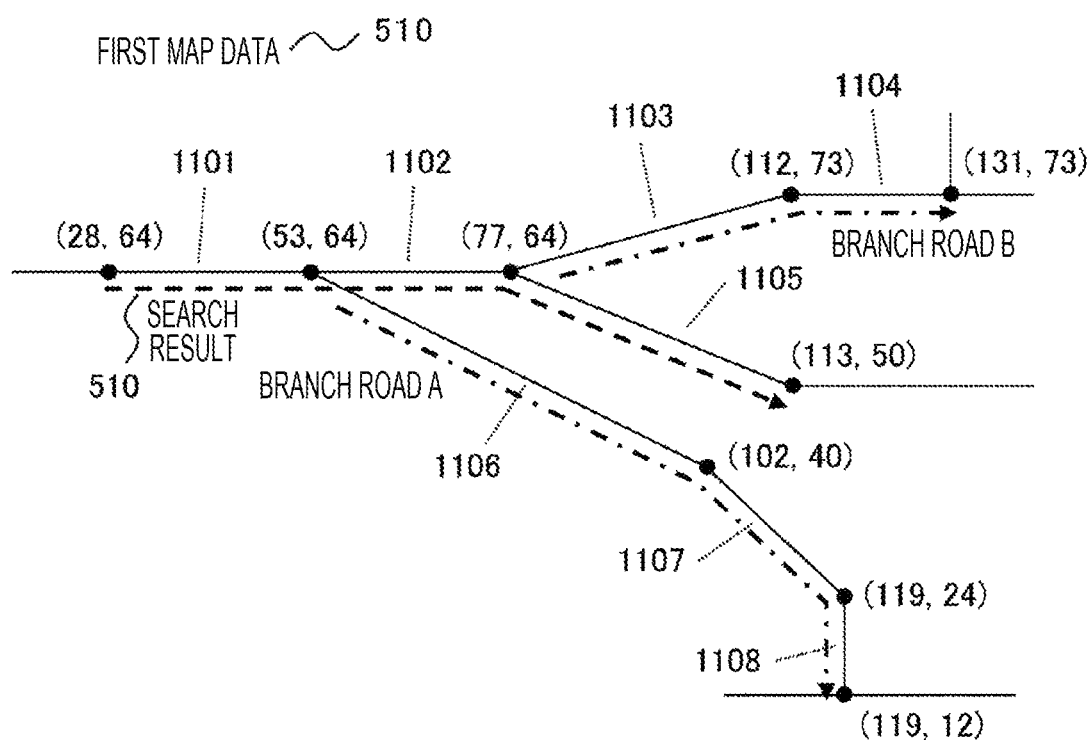
FIG. 11 is a view exemplifying a configuration of peripheral road information and a corresponding road.

FIG. 11 is a view illustrating a configuration example of the peripheral road information 550 generated by the above processing and a corresponding road in the first map data 510. As illustrated in the upper table of FIG. 11, the peripheral road information 550 is constituted by a branch ID 5501, an X coordinate 5502, a Y coordinate 5503, and an attribute 5504. A head link of each branch road in the first map data 510, that is, a link ID of a link at which each branch road branches from the route is stored in each field of the branch ID 5501. An X coordinate and a Y coordinate of each node through which a series of links constituting each branch road passes in the first map data 510 are stored in each field of the X coordinate 5502 and the Y coordinate 5503. An attribute of a link having each node as a start point in the first map data 510 is stored in each field of the attribute 5504. The first to fourth rows of the peripheral road information 550 correspond to a branch road A constituted by links 1106, 1107 and 1108 in the lower view of FIG. 11. In addition, the fifth to seventh rows correspond to a branch road B constituted by the links 1103 and 1104 in the lower view of FIG. 11.

Incidentally, information on coordinates and attributes of all the links of the branch road branching from the route and extending to the intersection with another road is included in the peripheral road information 550 in the above example. However, a branch road may be tracked and only information on coordinates and an attribute of a link connected to an intersection point between the branch road and another road, that is, a link immediately before the intersection point may be stored in the peripheral road information 550 in order to reduce data amount of the peripheral road information 550.

Figure 12:
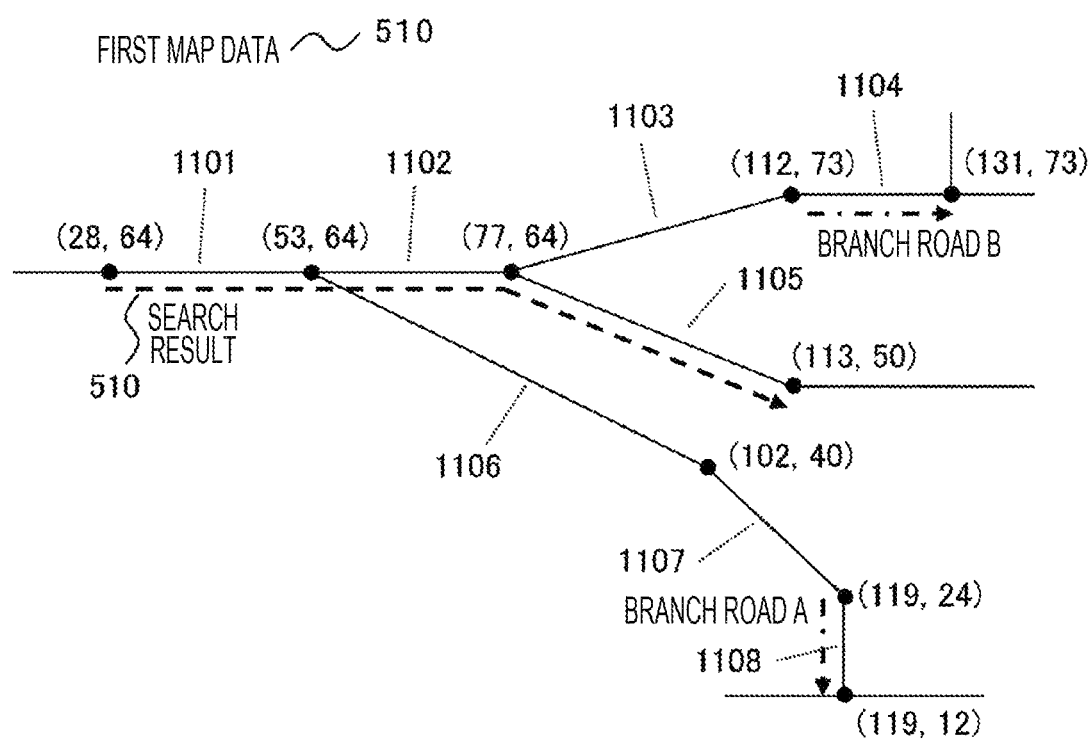
FIG. 12 is a view exemplifying a configuration of peripheral road information with a reduced data amount and a corresponding road.

FIG. 12 is a view illustrating a configuration example of the peripheral road information 550 with a reduced data amount and a corresponding road in the first map data 510. It is understood that the data amount is reduced in the peripheral road information 550 illustrated in FIG. 12 as compared with the peripheral road information 550 illustrated in FIG. 11 since only the information on the link immediately before the intersection (the link 1108 in the branch road A and the link 1104 in the branch road B) is stored.

The operation of the route information transmission apparatus 200 has been described as above. The generated position reference information 540 and the peripheral road information 550 are transmitted from the route information transmission apparatus 200 to the route information reception apparatus 300 by the communication unit 206.

Subsequently, an operation of the route information reception apparatus 300 will be described between the route information transmission apparatus 200 and the route information reception apparatus 300 in the navigation-cooperative autonomous driving system according to the present embodiment with reference to FIGS. 13 to 20.

Figure 13:
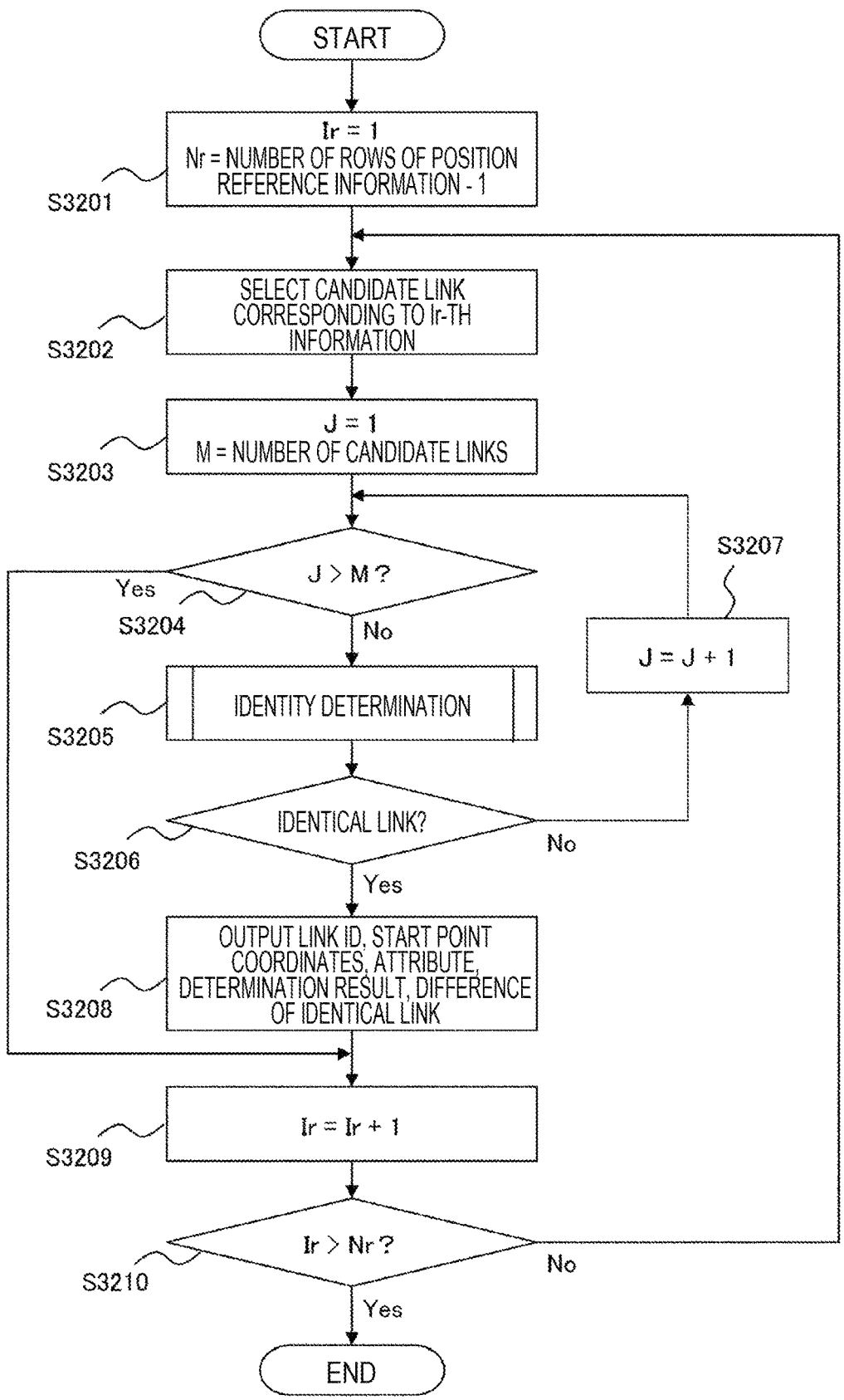
FIG. 13 is a flowchart exemplifying a process of a route information restoration unit.

FIG. 13 is a flowchart illustrating an operation of the route information restoration unit 320 which is executed to restore the route information 560 on the second map data 520 using the position reference information 540 when the route information reception apparatus 300 receives the position reference information 540 and the peripheral road information 550 from the route information transmission apparatus 200. The processing illustrated in this flowchart is executed when the position reference information 540 is input from the communication unit 306 in the route information restoration unit 320.

The route information restoration unit 320 first sets a value of one as an initial value for a variable Ir and a value obtained by subtracting one from the number of rows of the position reference information 540 to a variable Nr (step S3201). Since the number of rows of the position reference information 540 is four in the example illustrated in FIG. 9, three is set to the variable Nr.

Next, the route information restoration unit 320 refers to a row corresponding to the current value of the variable Ir in the position reference information 540 received from the route information transmission apparatus 200 to select one or more candidate links corresponding to a link represented by information stored in the row (hereinafter referred to as an Ir-th link) in the second map data 520 (step S3202). Here, one or more links having coordinates and attributes, similar to coordinates and attributes, respectively, indicated by the information stored in the Ir-th row of the position reference information 540, in the second map data 520 are selected as candidate links corresponding to the route. Incidentally, a calculation process for determining similarity at the time of selecting this candidate link will be described later with reference to FIG. 14.

Next, the route information restoration unit 320 sets one as an initial value to a variable J and sets the number of candidate links selected in the step S3202 to a variable M (step S3203).

Next, the route information restoration unit 320 compares the current value of the variable J with a value of the variable M set in step S3203 to determine whether the variable J exceeds the variable M (step S3204). As a result, the processing proceeds to step S3205 if the variable J does not exceed the variable M, and the processing proceeds to step S3209 if the variable J exceeds the variable M.

Next, the route match determination unit 330 is used to execute an identity determination process to determine whether the candidate link selected in step S3202 indicates the identical road to the route searched by the route information transmission apparatus 200 (step S3205). Here, it is determined whether a J-th candidate link corresponding to the current value of the variable J among the plurality of candidate links selected in step S3202 is the identical link to the Ir-th link in the position reference information 540 referred to in step S3202, with reference to the peripheral road information 550 received from the route information transmission apparatus 200. Incidentally, details of this identity determination process will be described later with reference to FIGS. 15 to 19.

Next, the route information restoration unit 320 determines whether a determination result that the J-th candidate link and the Ir-th link are identical has been obtained in the identity determination process in step S3205. As a result, if it is determined that these links are not identical, one is added to the variable J (step S3207), and the processing returns to step S3204. On the other hand, if it is determined that these links are identical, the processing proceeds to step S3208.

Next, the route information restoration unit 320 outputs a link ID, an X coordinate and a Y coordinate of a start point, a determination result, and a content of a difference of a candidate link in the second map data 520 regarding the candidate links determined to be identical to the Ir-th link in the identity determination process in step S3205 (step S3208).

When the information on the candidate link determined to be identical to the Ir-th link is output in step S3208 or when it is determined in step S3204 that there is no candidate link determined to be identical to the Ir-th link and that variable J has reached a value exceeding the variable M, the route information restoration unit 320 then adds one to the variable Ir (step S3209).

Next, the route information restoration unit 320 compares a value of the variable Ir obtained by adding one in step S3209 is compared with a value of the variable Nr set in step S3201 to determine whether the variable Ir has reached a value exceeding the variable Nr (step S3210). As a result, if the variable Ir does not exceed the variable Nr, the processing returns to step S3202, and then, the processes of step S3202 and the subsequent steps are repeated. On the other hand, if the variable Ir exceeds the variable Nr, the processing illustrated in the flowchart of FIG. 13 is ended.

FIG. 14 illustrates an outline of the process of calculating the similarity of the link when selecting the candidate link, which is executed in step S3202 of FIG. 13. The upper left table of FIG. 14 illustrates the first to third rows of the position reference information 540 illustrated in FIG. 9. Incidentally, attributes of links having each node as a start point are illustrated by setting the national highway to one and the prefectural highway to two.

The upper right table of FIG. 14 is obtained by extracting the link ID 5201, the start point X coordinate 5202, the start point Y coordinate 5203, and the attribute 5206 from the second map data 520 illustrated in FIG. 5. In the attribute 5206, an attribute of each link is indicated with one as the national road and two as the prefectural road, which is similar to the above-described position reference information 540.

The lower table of FIG. 14 describes positions of nodes indicated by the information of each row of the position reference information 540 as "Position 1", "Position 2", and describes "Position 3", and a numerical value indicating a difference from each link on the second map data 520 and a rank of the difference in each of these positions. Here, a higher rank is set as a difference is smaller.

In the above table, a value calculated by the following Calculation Formula (1) is used as the numerical value of the difference as described below the table. The first term of Calculation Formula (1) indicates a value obtained by multiplying a predetermined weight W1 and a distance between a position of each node indicated by an X coordinate (X1) and a Y coordinate (Y1) of the position reference information 540 and a position of a node indicated by a start point X coordinate (X2) and a start point Y coordinate (Y2) of each link in the second map data 520. In FIG. 14, it is assumed that W1=25. In addition, the second term of Calculation Formula (1) indicates a value obtained by multiplying a predetermined weight W2 and a difference between a value of an attribute (A1) of the position reference information 540 and a value of an attribute (A2) of each link in the second map data 520. In FIG. 14, it is assumed that W2=50. In Calculation Formula (1), the numerical value indicating the difference between the position of each node indicated by the position reference information 540 and the link on the second map data 520 is calculated by obtaining the sum of these values. That is, as a value of the difference calculated by Calculation Formula (1) is smaller, the similarity of the link on the second map data 520 is higher, which indicates that the link is similar to the position reference information 540.

$$\text{Difference}=W1\times\sqrt{\{(X1-X2)2+(Y1-Y2)2\}}+W2\times|A1-A2| \quad (1)$$

Incidentally, the hyphen ("-") indicates a rank of a link whose difference value calculated by Calculation Formula (1) is 500 or more in the lower table of FIG. 14. This means that the link is not a candidate link. For example, candidate links corresponding to the node (Position 2) indicated by the information on the second row of the position reference information 540 are three links of the links 2102, 2013, and 2107 in the lower table of FIG. 14. Further, a rank of the link 2102 is set as the first (difference=125), a rank of the link 2103 is set as the second (difference=425), the rank of the link 2107 is set as the third (difference=475) in an ascending order of the value of the difference with respect to Position 2. In this case, the processes from step S3204 to step S3206 are repeated for each of the three links 2102, 2103, and 2107 after three, which is the number of candidate links, is set to the variable M in step S3203 in the processing illustrated in FIG. 13.

Incidentally, the processing procedure described above is an example of the processing to realize selection of the candidate link and calculation of the similarity, and the invention is not necessarily limited to this method. Any processing procedure may be used as long as the similarity between the position reference information 540 and each link in the second map data 520 is appropriately calculated and a candidate link can be selected from a result of the calculation.

Figure 15:
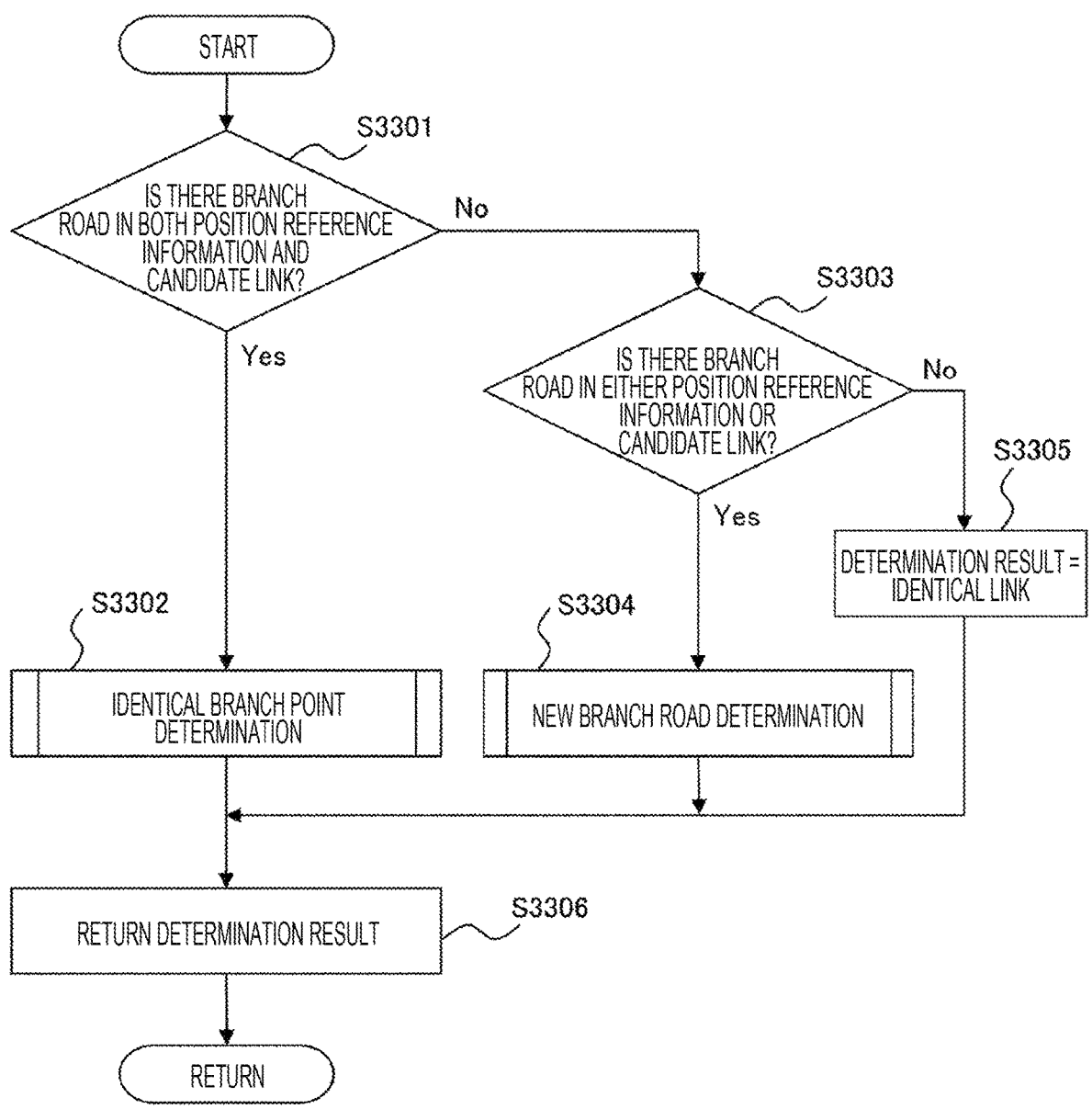
FIG. 15 is a flowchart exemplifying a process of a route match determination unit.

FIG. 15 is a flowchart illustrating details of the identity determination process which is executed by the route match determination unit 330 in step S3205 of FIG. 13.

The route match determination unit 330 first determines whether a branch road is present in both the Ir-th link indicated by the position reference information 540 and the J-th candidate link (step S3301). Here, whether the branch road is present in the J-th candidate link can be determined depending on whether a road different from the route branches from a start point of the J-th candidate link in the second map data 520. In addition, whether the branch road is present in the Ir-th link can be determined depending on whether the information stored in the Ir-th row in the position reference information 540 has a branch ID, that is, whether the link ID of the branch road is stored in the field of the Ir-th row of the branch ID 5405. As a result, if it is determined that the branch road is present in both the links, the identical branch point determination process to determine whether both branch roads are an identical road is performed (step S3302). The identical branch point determination process will be described later with reference to FIGS. 16 and 17.

On the other hand, if it is determined in step S3301 that there is no branch road in both the Ir-th link and the J-th candidate link, the route match determination unit 330 determines whether one of the links has a branch road (step S3303). As a result, if it is determined that a branch road is present in either one, a new branch road determination process is performed (step S3304) to determine whether the branch road is a newly-built road (or an abandoned road) that is not present in one map data. The new branch road determination process will be described later with reference to FIGS. 18 and 19.

If it is determined in step S3303 that no branch road is present in both the Ir-th link and the J-th candidate link, the route match determination unit 330 determines that these links are the identical link (step S3305).

Next, the route match determination unit 330 returns the result determined in any of step S3302, step S3304, or step S3305 to the route information restoration unit 320 (step S3306). After executing step S3306, the identity determination process performed by the route match determination unit 330 is ended, and the route information restoration unit 320 proceeds the processing to step S3205 in FIG. 13.

Figure 16:
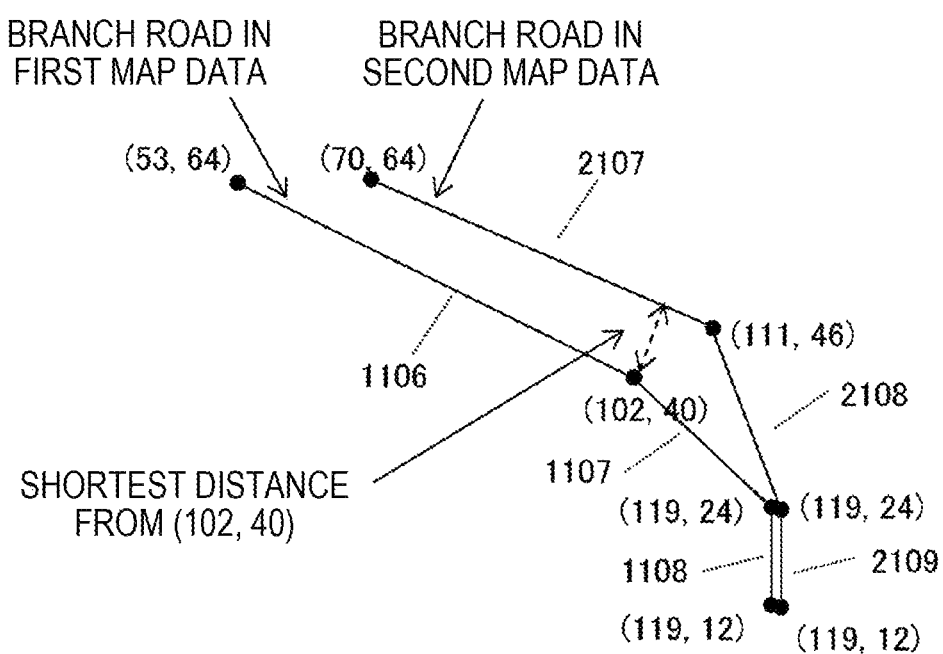
FIG. 16 is a view for describing an outline of an identical branch point determination process.

FIG. 16 is a view illustrating an outline of the identical branch point determination process executed by the route match determination unit 330 in step S3302 of FIG. 15. The determination on whether branch points are identical is made by determining whether a branch road from the Ir-th link in the first map data 510 indicated by the peripheral road information 550 and a shape of a branch road starting from the start point of the J-th candidate link in the second map data 520 are similar to each other. As illustrated in FIG. 16, the similarity of the shape of these branch roads can be determined by calculating the shortest distance from each node constituting the branch road in the first map data 510 to the branch road in the second map data 520 and determining whether this value falls within a predetermined threshold.

Figure 17:
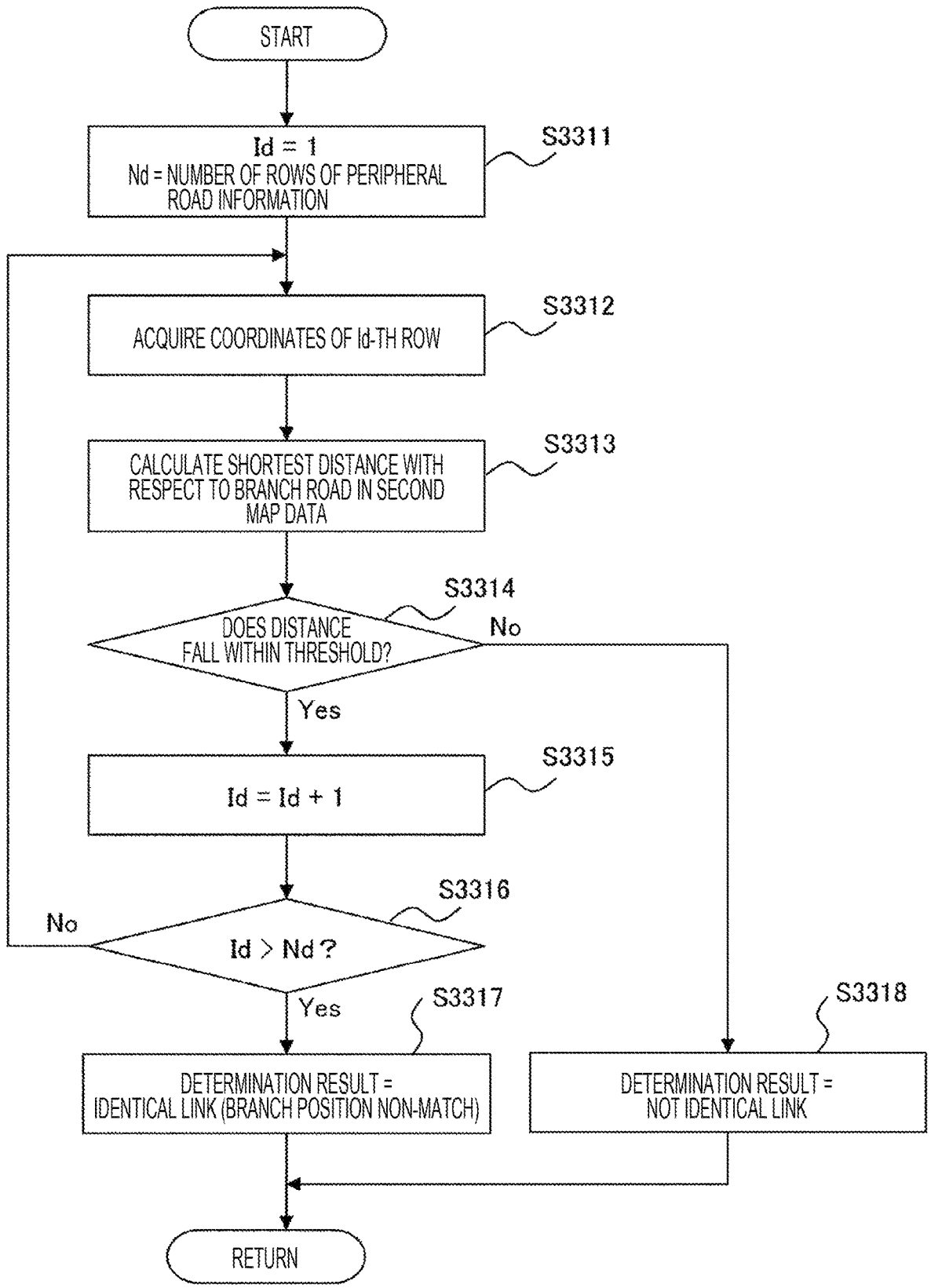
FIG. 17 is a flowchart exemplifying the identical branch point determination process.

FIG. 17 is a flowchart illustrating details of the identical branch point determination process illustrated in FIG. 16. The route match determination unit 330 first sets one to a variable Id, and sets the number of rows of the peripheral road information 550, which corresponds to the link ID of the branch road from the Ir-th link indicated by the position reference information 540, that is, the link ID stored in the field of the Ir-th row of the branch ID 5405 in the position reference information 540, to a variable Nd (step S3311). For example, "1106", which is a link ID corresponding to the branch road A, is stored in four rows in the branch ID 5501 of the peripheral road information 550 regarding the branch road A illustrated in FIG. 11, and thus, four is set to the variable Nd.

Next, the route match determination unit 330 acquires values stored in coordinates of the Id-th row of the peripheral road information 550, that is, the Id-th rows of the X coordinate 5502 and the Y coordinate 5503I, respectively (step S3312).

Next, the route match determination unit 330 calculates the shortest distance between the coordinates of the Id-th row of the peripheral road information 550 acquired in step S3312 and the branch road from the start point of the J-th candidate link in the second map data 520 (step S3313).

Next, the route match determination unit 330 determines whether the shortest distance calculated in step S3313 falls within a predetermined threshold (step S3314). As a result, if the shortest distance falls within the threshold, one is added to the variable Id (step S3315), and the processing proceeds to step S3316.

Next, the route match determination unit 330 compares a value of the variable Id to which one has been added in step S3315 with a value of the variable Nd set in step S3311 to determine whether the variable Id has reached a value exceeding the variable Nd (step S3316). As a result, if the variable Id does not exceed the variable Nd, the processing returns to the step S3312, and the processes of step S3312 and the subsequent steps are repeated. On the other hand, if the variable Id has reached the value exceeding the variable Nd, that is, if it has been confirmed in step S3314 that the shortest distance from the J-th candidate link in the second map data 520 to the branch road falls within the threshold for all the nodes constituting the branch road from the Ir-th link in the first map data 510 indicated by the peripheral road information 550, the processing proceeds to step S3317.

Next, the route match determination unit 330 regards the branch road from the Ir-th link in the first map data 510 and the branch road from the J-th candidate link in the second map data 520 as the same road, and determines that the Ir-th link and the J-th candidate link are the same link (step S3317). Accordingly, a determination result that the candidate link selected in step S3202 is identical to the route indicated by the position reference information 540 is obtained as a result of the identity determination process in step S3205 of FIG. 13.

In addition, if it is determined in step S3314 that the shortest distance exceeds the threshold, the route match determination unit 330 regards the branch road from the Ir-th link in the first map data 510 and the branch road from the J-th candidate link in the second map data 520 as different roads, and determines that the Ir-th link and the J-th candidate link are not the same link (step S3318). That is, if it is confirmed in step S3314 that the shortest distance from the J-th candidate link in the second map data 520 to the branch road exceeds the threshold with respect to at least one of the nodes constituting the branch road from the Ir-th link in the first map data 510 indicated by the peripheral road information 550, it is determined in step S3318 that these branch roads are different roads and inks connected to these branch roads in the first map data 510 and the second map data 520, respectively, are not the same. Accordingly, a determination result that the candidate link selected in step S3202 and the route indicated by the position reference information 540 are not identical is obtained as a result of the identity determination process in step S3205 of FIG. 13.

After executing step S3317 or S3318, the route match determination unit 330 ends the identical branch point determination process and causes the processing to proceed to step S3306 in FIG. 15.

With the identical branch point determination process described above, the route match determination unit 330 calculates the shortest distance between the branch road branching from the route in the first map data 510 and the branch road branching from the candidate link in the second map data 520 based on the peripheral road information 550. Further, it is determined whether the link constituting the route in the first map data 510 matches the candidate link in the second map data 520 based on the calculated shortest distance.

Figure 18:
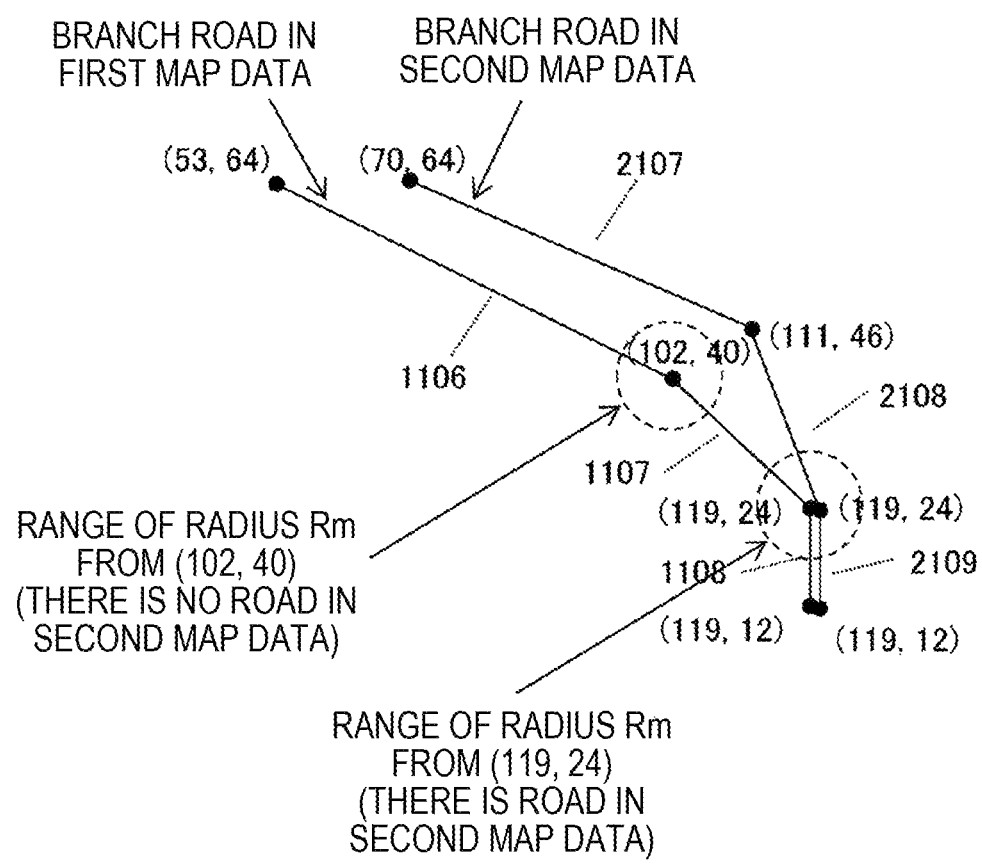
FIG. 18 is a view for describing an outline of a new branch road determination process.

FIG. 18 is a view illustrating an outline of a new branch road determination process executed by the route match determination unit 330 in step S3304 of FIG. 15. The determination on whether a branch road is new is performed by determining whether a road similar to a branch road exists in the other map data with respect to the branch road from the Ir-th link in the first map data 510 indicated by the peripheral road information 550 or the branch road from the J-th candidate link in the second map data 520. Whether the road similar to the branch road in one map data exists in the other map data can be performed by setting a range having a radius of a predetermined threshold R for each node constituting the branch road in one map data, and determining whether the road exists in the other map data within this range.

Figure 19:
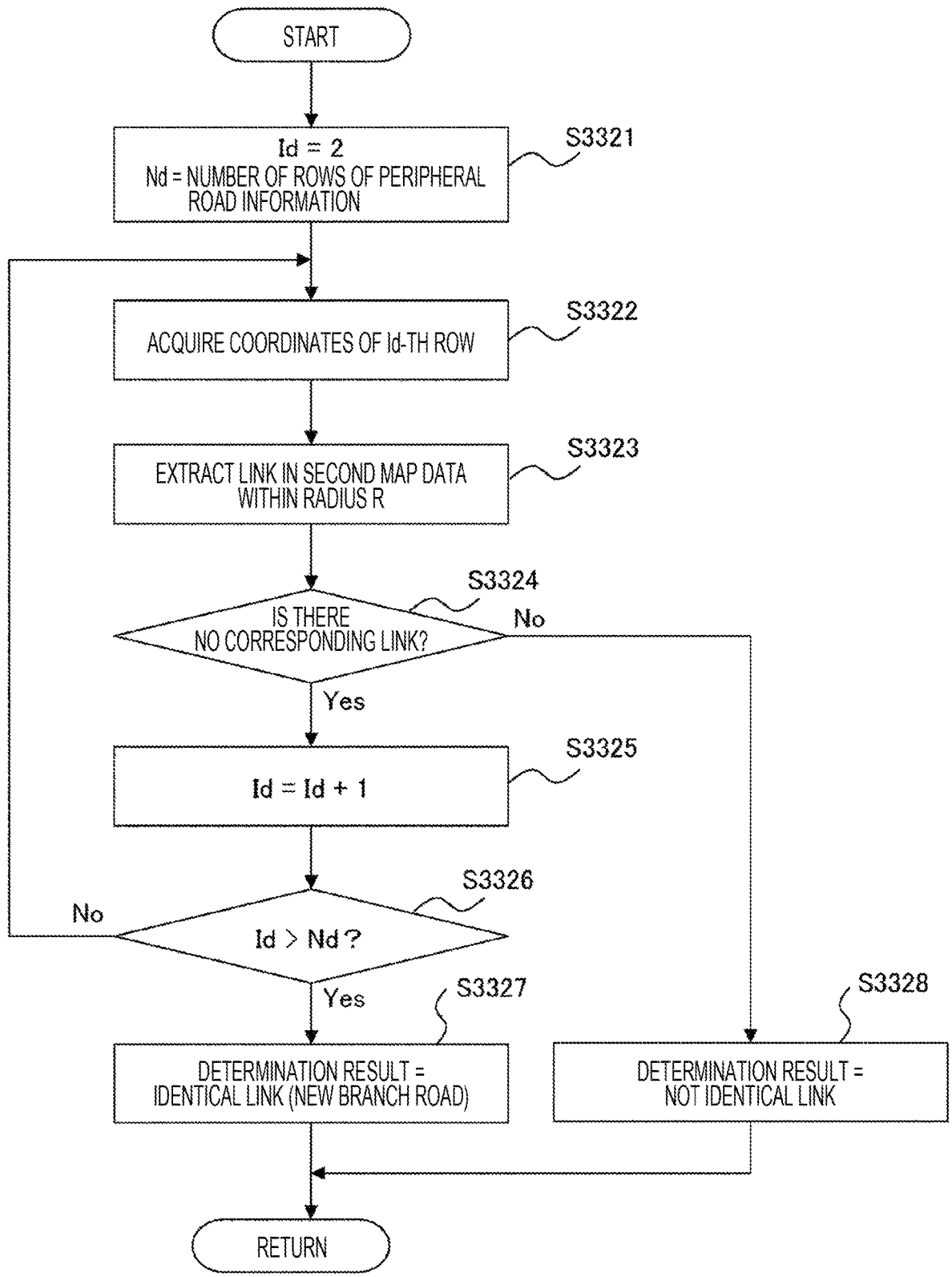
FIG. 19 is a flowchart exemplifying the new branch road determination process.

FIG. 19 is a flowchart illustrating details of the new branch road determination process illustrated in FIG. 18. Incidentally, FIG. 19 describes the new branch road determination process by exemplifying a case where a branch road exists only in the first map data 510. When there is a branch road only in the second map data 520, the branch road is determined to be a new branch road, and the processing proceeds to step S3306 in FIG. 15. The route match determination unit 330 first sets two to a variable Id, and sets the number of rows of the peripheral road information 550, which corresponds to the link ID of the branch road from the Ir-th link indicated by the position reference information 540, that is, the link ID stored in the field of the Ir-th row of the branch ID 5405 in the position reference information 540, to a variable Nd (step S3321). For example, "1106", which is a link ID corresponding to the branch road A, is stored in four rows in the branch ID 5501 of the peripheral road information 550 regarding the branch road A illustrated in FIG. 11, and thus, four is set to the variable Nd.

Next, the route match determination unit 330 acquires values stored in coordinates of the Id-th row of the peripheral road information 550, that is, the Id-th rows of the X coordinate 5502 and the Y coordinate 5503, respectively (step S3322).

Next, the route match determination unit 330 extracts a link existing in the second map data 520 within the range of the radius R from coordinates of the Id-th row of the peripheral road information 550 acquired in the step S3322 (step S3323).

Next, the route match determination unit 330 determines whether the link corresponding to the above condition has been extracted in the second map data 520 in step S3323 (step S3324). As a result, one is added to the variable Id if the corresponding link does not exist (step S3325), and the processing proceeds to step S3326.

Next, the route match determination unit 330 compares a value of the variable Id to which one has been added in step S3325 with a value of the variable Nd set in step S3321, and determines whether the variable Id has reached a value exceeding the variable Nd (step S3326). As a result, if the variable Id does not exceed the variable Nd, the processing returns to the step S3322, and the processes of step S3322 and the subsequent steps are repeated. On the other hand, if the variable Id has reached the value exceeding the variable Nd, that is, if it has been confirmed in step S3324 that there is no link in the second map data 520 within the range of the radius R from the relevant node for all the second and subsequent nodes excluding the first node corresponding to the branch point among the nodes constituting the branch road from the Ir-th link in the first map data 510 indicated by the peripheral road information 550, the processing proceeds to step S3327.

Next, the route match determination unit 330 regards the branch road from the Ir-th link in the first map data 510 or the branch road from the J-th candidate link in the second map data 520 as the new branch road, and determines that the Ir-th link and the J-th candidate link are the same link (step S3327). Accordingly, a determination result that the candidate link selected in step S3202 is identical to the route indicated by the position reference information 540 is obtained as a result of the identity determination process in step S3205 of FIG. 13.

In addition, if it is determined in step S3324 that there is a link in the second map data 520 within the range of the radius R, the route match determination unit 330 regards the branch road from the Ir-th link in the first map data 510 or the branch road from the J-th candidate link in the second map data 520 not as the new branch road, and determines that the Ir-th link and the J-th candidate link are not the same link (step S3328). That is, if it has been confirmed in step S3324 that the link in the second map data 520 exists within the range of the radius R for at least one of all the second and subsequent nodes excluding the first node corresponding to the branch point among the nodes constituting the branch road from the Ir-th link in the first map data 510 indicated by the peripheral road information 550, it is determined in step S3328 that the Ir-th link and the J-th candidate link are not identical. Accordingly, a determination result that the candidate link selected in step S3202 and the route indicated by the position reference information 540 are not identical is obtained as a result of the identity determination process in step S3205 of FIG. 13.

After executing the step S3327 or S3328, the route match determination unit 330 ends the new branch road determination process and causes the processing to proceed to the step S3306 in FIG. 15.

According to the new branch road determination process described above, the route match determination unit 330 determines the presence or absence of the link in the second map data 520 existing within a predetermined distance from the branch road branching from the route in the first map data 510 or the presence or absence of the link in the first map data 510 existing within a predetermined distance from the branch road branching from the candidate link in the second map data 520 based on the peripheral road information 550. Further, it is determined whether the link constituting the route in the first map data 510 matches the candidate link in the second map data 520 based on a result of such determination.

Figure 20:
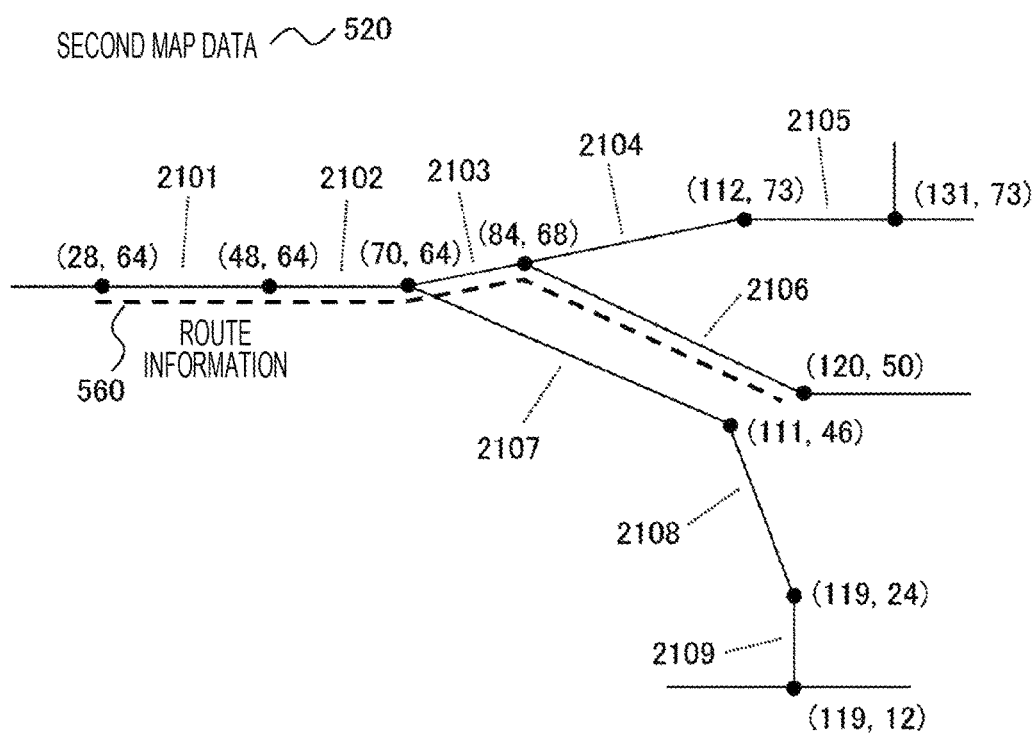
FIG. 20 is a view exemplifying a configuration of restored route information and a corresponding road.

FIG. 20 is a view illustrating a configuration of the route information 560 restored by the processes of FIGS. 13 to 19 described above and a corresponding road in the second map data 520. As illustrated in the upper table of FIG. 20, the route information 560 is constituted by a link ID 5601, an X coordinate 5602, a Y coordinate 5603, an attribute 5604, and a determination result 5605. A link ID of each link constituting the route in the second map data 520 is stored in each field of the link ID 5601. An X coordinate and a Y coordinate of a node constituting a start point of each link are stored in each field of the X coordinate 5602 and the Y coordinate 5603. For example, a type of a road represented by each link is stored as an attribute of each link in each field of the attribute 5604. A determination result of the identity determination process performed by the route match determination unit 330 for each link is stored in each field of the determination result 5605.

The route information reception apparatus 300 transmits the route information 560 to the vehicle control ECU 400. The vehicle control ECU 400 controls the sensor 410 and the actuator 420 to move the vehicle 100 in accordance with the received route information 560. As a result, even when the first map data 510 and the second map data 520 are different, the vehicle 100 can be moved along the correct route. That is, when a road whose coordinates and attributes are most similar to the search result 530 is simply selected as described in FIG. 6, the vehicle 100 moves to the right direction (link 2107) at a branch point (70, 64). However, the vehicle 100 advances to the left direction (the straight traveling direction in the first map data 510) at the branch point (70, 64) and advances to the right direction at the next branch point (84, 68) by the processes described above, and thus, can advance along the correct route.

According to the first embodiment of the present invention described above, the following operational effects are achieved.

(1) In the route information conversion system, the route information transmission apparatus 200 includes: the route search unit 220 that generates the route search result 530 with reference to the first map data 510; the position reference information generation unit 230 that generates the position reference information 540 indicating a road corresponding to the search result 530; and the peripheral road information generation unit 240 that generates the peripheral road information 550 indicating a road branching from the road corresponding to the search result 530. In addition, the route information reception apparatus 300 includes: the route information restoration unit 320 that restores the route information 560 on the second map data 520 from the position reference information 540; and the route match determination unit 330 that determines whether the search result on the first map data 510 matches the route information 560 on the second map data 520 with reference to the peripheral road information 550. In this manner, the information on the route can be correctly transmitted between different types of map data, that is, between the first map data 510 and the second map data 520.

(2) The position reference information 540 includes the information stored in the respective fields of the X coordinate 5402, the Y coordinate 5403, and the attribute 5404 in FIG. 9 as the information indicating the coordinates and attributes of one or more road links constituting the route in the first map data 510. The route information restoration unit 320 restores the route information 560 on the second map data 520 by selecting the road link having coordinates and attributes similar to the coordinates and attributes, respectively, indicated by the position reference information 540 in the second map data 520 (step S3202). In this manner, it is possible to easily restore the route information 560 on the second map data 520 from the position reference information 540 in the route information restoration unit 320.

(3) The peripheral road information 550 includes the information stored in the respective fields of the X coordinate 5502, the Y coordinate 5503, and the attribute 5504 in FIG. 11 as the information indicating the coordinates and attributes of one or more road links constituting the branch road that branches from the route and intersects with another road different from the route in the first map data 510. The route match determination unit 330 compares the peripheral road information 550 with the second map data 520 to determine whether the search result on the first map data 510 matches the route information 560 on the second map data 520 (step S3205). In this manner, it is possible to correctly determine whether the search result on the first map data 510 matches the route information 560 on the second map data 520 in the route match determination unit 330.

(4) In the first map data 510, the peripheral road information 550 includes at least the information indicating the coordinates and attributes of the road link connected to the intersection point between the branch road and another road.

In this manner, the data amount of the peripheral road information 550 can be reduced as necessary.

(5) The position reference information 540 includes information stored in each field of the branch ID 540 of FIG. 9 as the information indicating the presence or absence of a branch road (first branch road) branching from the route in the first map data 510. The route information restoration unit 320 restores the route information 560 on the second map data 520 by selecting the candidate link corresponding to the route in the second map data 520. The route match determination unit 330 determines the presence or absence of the first branch road based on the position reference information 540 and determines the presence or absence of a branch road (second branch road) branching from the candidate link based on the second map data 520 (steps S3301 and S3303). As a result, if it is determined that both the first branch road and the second branch road are present (step S3301: Yes), the route match determination unit 330 calculates the shortest distance between the first branch road and the second branch road based on the peripheral road information 550 (step S3313), and determines whether the road link constituting the route in the first map data 510 and the candidate link match each other based on the calculated shortest distance (steps S3314, S3317, and S3318), in the identical branch point determination process illustrated in FIG. 17. In this manner, when the branch road from the route is present in the first map data 510 and the branch road from the candidate link is present in the second map data 520, it is possible to accurately determine whether the road link constituting the route in the first map data 510 and the candidate link in the second map data 520 match each other.

(6) In addition, if it is determined that one of the first branch road and the second branch road is not present (step S3303: Yes), the route match determination unit 330 determines the presence or absence of the road link in the second map data 520 existing within the radius R of the predetermined distance from the first branch road or the presence or absence of the road link in the first map data 510 existing within the radius R of the predetermined distance from the second branch road based on the peripheral road information 550 (steps S3323 and S3324), and determines whether the road link constituting the route in the first map data 510 and the candidate link match each other based on such a determination result (steps S3327 and S3328), in the new branch road determination process illustrated in FIG. 19. In this manner, when the branch road from the route is not present in the first map data 510 or when the branch road from the candidate link is not present in the second map data 520, it is possible to accurately determine whether the link constituting the route in the first map data 510 and the candidate link in the second map data 520 match each other.

(7) Further, if it is determined that neither the first branch road nor the second branch road is present (step S3303: No), the route match determination unit 330 determines that the road link constituting the route in the first map data 510 matches the candidate link (step S3305). In this manner, when the branch road from the route is not present in the first map data 510 and the branch road from the candidate link is not present in the second map data 520, it is possible to accurately determine that the link constituting the route in the first map data 510 and the candidate link in the second map data 520 match each other.

(8) The route information transmission apparatus 200 further includes the communication unit 206 that transmits the position reference information 540 and the peripheral road information 550 to the route information reception apparatus 300. In this manner, it is possible to reliably transmit the generated position reference information 540 and peripheral road information 550 to the route information reception apparatus 300.

(9) The route information transmission apparatus 200 further includes the display unit 203 that displays the information including the first map data 510, the operation unit 204 that receives the operation to set the destination of the route, and the destination setting unit 210 that inputs the destination set based on the operation on the operation unit 204 to the route search unit 220. The route search unit 220 generates the search result 530 based on the destination input from the destination setting unit 210. In this manner, a user can easily set an arbitrary destination and allow the route search unit 220 to search the route to the destination.

(10) The route information reception apparatus 300 further includes the communication unit 306 that receives position reference information 540 indicating the search result of the route in the first map data 510 and the peripheral road information 550 indicating the road branching from the route, from the route information transmission apparatus 200. In this manner, the position reference information 540 and the peripheral road information 550 transmitted from the route information transmission apparatus 200 can be reliably received by the route information reception apparatus 300.

(11) The route information reception apparatus 300 further includes the second communication unit 307 that transmits the route information 560 restored by the route information restoration unit 320. In this manner, it is possible to realize the autonomous driving of the vehicle 100 with the vehicle control ECU 400 using the route information 560 restored in the route information reception apparatus 300.

Incidentally, the position reference information 540 and the peripheral road information 550 transmitted from the route information transmission apparatus 200 are received by the route information reception apparatus 300, and the route information 560 restored based on these pieces of information is transmitted from the route information reception apparatus 300 to the vehicle control ECU 400 in the first embodiment described above, but the present invention is not limited thereto. For example, it may be configured such that the position reference information 540 and the peripheral road information 550 are generated using the route search result 530 based on the second map data 520 in the route information reception apparatus 300, and these pieces of information are transmitted to the route information transmission apparatus 200 serving as the car navigation system such that the route information 560 is restored based on the received position reference information 540 and peripheral road information 550 using the first map data 510 in the route information transmission apparatus 200. In addition, the vehicle control ECU 400 may serve some or all of the functions of the route information reception apparatus 300, or conversely, the route information reception apparatus 300 may serve some or all of the functions of the vehicle control ECU 400.

Second Embodiment

Hereinafter, a route information conversion system according to a first embodiment of the present invention will be described with reference to FIGS. 21 to 23. In the following second embodiment, the route information conversion system according to the present invention is applied to a center-generated route distribution system, and a description will be given regarding an example in which not old map data stored inside a car navigation system but the latest map data stored in a center system is used at the time of setting a route of the car navigation system installed in a vehicle. That is, functions other than route search, for example, route guide is realized by using the internally stored map data in the car navigation system in the second embodiment, but the route search is executed using the map data stored in the center system. As a result, it is possible to guide the vehicle with reference to the map data inside the car navigation system along the route created with reference to the map data of the center system.

Figure 21:
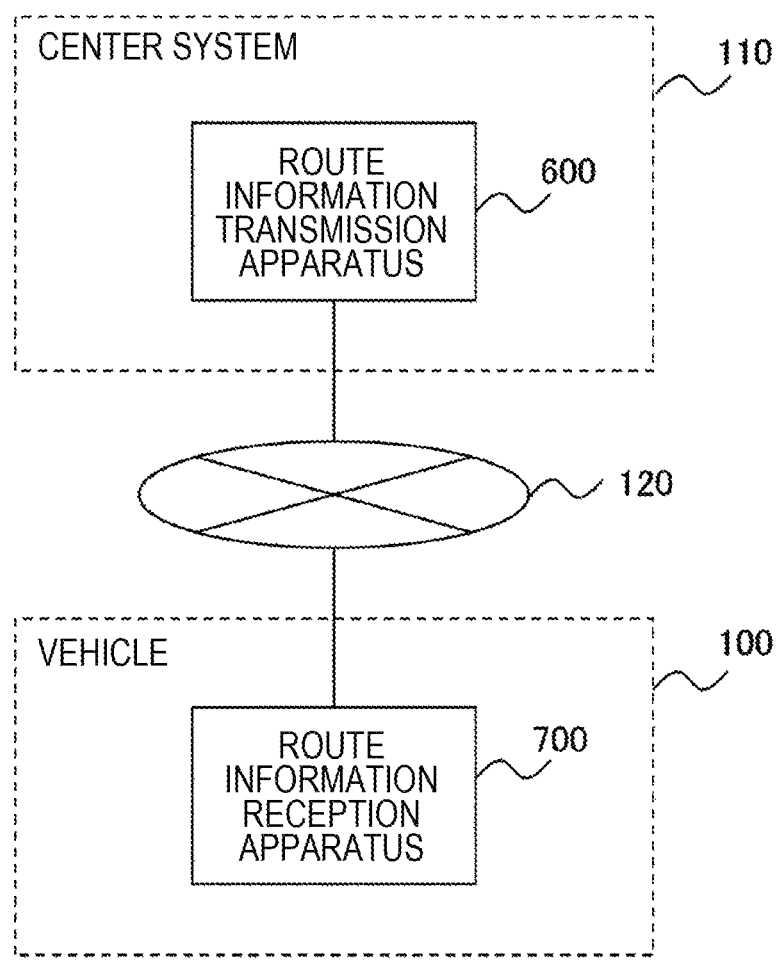
FIG. 21 is an overall configuration diagram of a center-generated route distribution system according to a second embodiment of the present invention.

FIG. 21 is an overall configuration diagram of the center-generated route distribution system according to the second embodiment of the present invention. The center-generated route distribution system illustrated in FIG. 21 is configured as a route information reception apparatus 700 mounted on the vehicle 100 and a route information transmission apparatus 600 installed in a center system 110 are connected to each other via a communication network 120 such as the Internet and a cellular phone network.

The route information reception apparatus 700 corresponds to the car navigation system. The route information transmission apparatus 600 corresponds to a server device that generates a route along which the vehicle 100 needs to travel and distributes the generated route to the route information reception apparatus 700.

Figure 22:
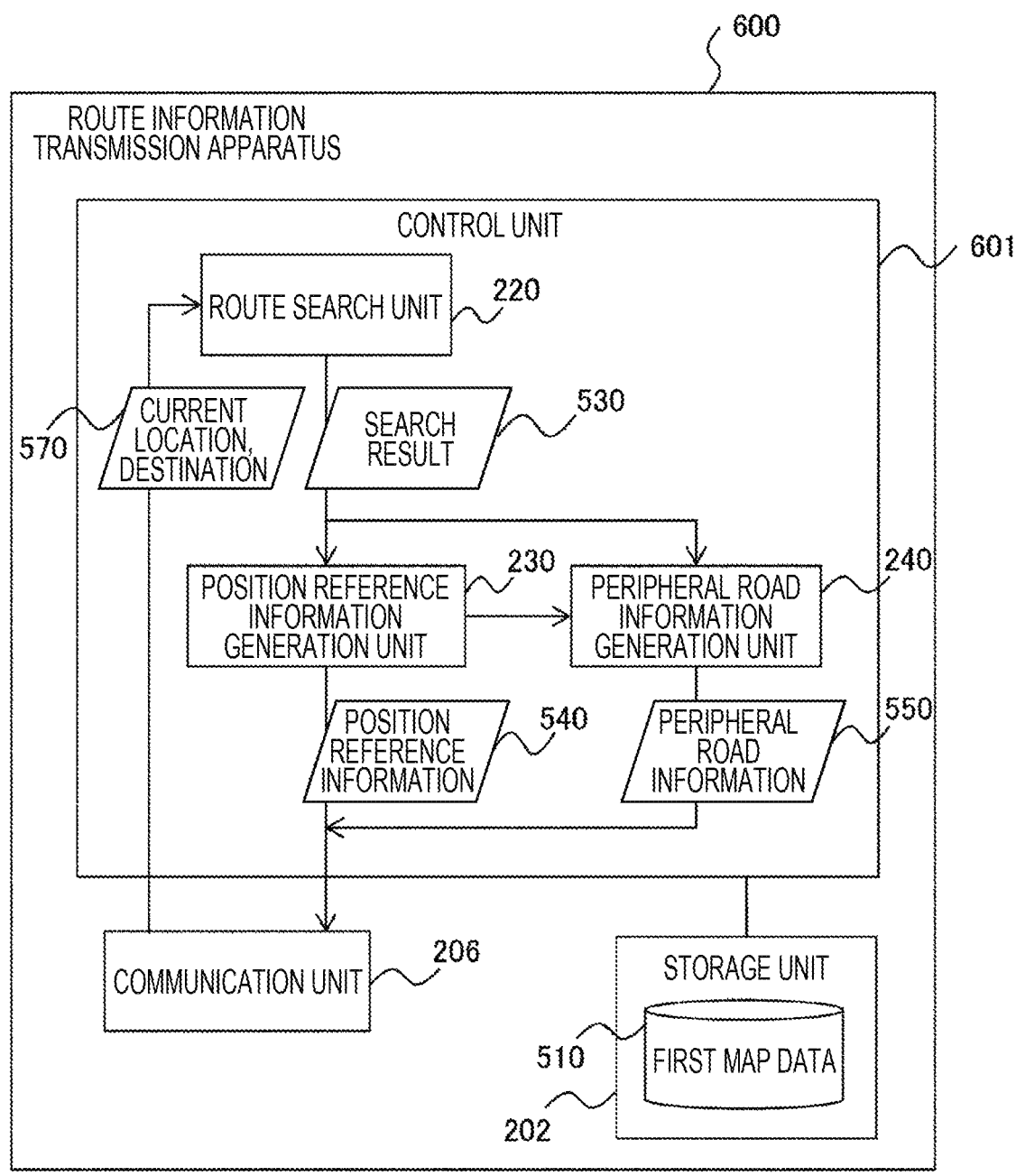
FIG. 22 is a configuration diagram of a route information transmission apparatus according to the second embodiment.

FIG. 22 is a configuration diagram of the route information transmission apparatus 600. The route information transmission apparatus 600 includes a control unit 601, the storage unit 202, and the communication unit 206. Incidentally, the storage unit 202 and the communication unit 206 are similar to those described in the first embodiment, respectively, and the storage unit 202 stores the first map data 510 which is map data for navigation.

The control unit 601 executes a series of processes for generation of the route along which the vehicle 100 needs to travel, and is constituted by a CPU, a ROM, a RAM, and the like. The control unit 601 has functional blocks of the route search unit 220, the position reference information generation unit 230, and the peripheral road information generation unit 240. These functional blocks are functions to be realized as software modules as the CPU executes predetermined programs. Alternatively, these functional blocks may be realized as dedicated hardware.

The route search unit 220 refers to the first map data 510 stored in the storage unit 202 based on the route search information 570 indicating a current location and a destination received by the communication unit 206 from the route information reception apparatus 700 to generate a search result 530 of the route along which the vehicle 100 needs to travel from the current location to the destination, which is similar to the first embodiment.

The position reference information generation unit 230 generates position reference information 540 indicating a road indicating a searched route, that is, a road corresponding to the search result 530 based on the search result 530 input from the route search unit 220, which is similar to the first embodiment.

The peripheral road information generation unit 240 generates peripheral road information 550 indicating a road branching from the searched route, that is, a road branching from the road corresponding to the search result 530 based on the search result 530 input from the route search unit 220 and the position reference information 540 input from the position reference information generation unit 230, which is similar to the first embodiment.

The communication unit 206 communicates with the route information reception apparatus 700 via the communication network 120. The route search information 570 transmitted from the route information reception apparatus 700 is received by the route information transmission apparatus 200 through the communication performed by the communication unit 206. In addition, position reference information 540 generated by the position reference information generation unit 230 and the peripheral road information 550 generated by the peripheral road information generation unit 240 are transmitted from the route information transmission apparatus 600 to the route information reception apparatus 700.

As described above, the route information transmission apparatus 600 of the present embodiment is different from the route information transmission apparatus 200 described in the first embodiment in terms of not including the display unit 203, the operation unit 204, the position detection unit 205, and the destination setting unit 210, but receiving the route search information 570 indicating the current location and the destination from the route information reception apparatus 700 via the communication unit 206 and inputting the received route search information 570 to the route search unit 220.

Figure 23:
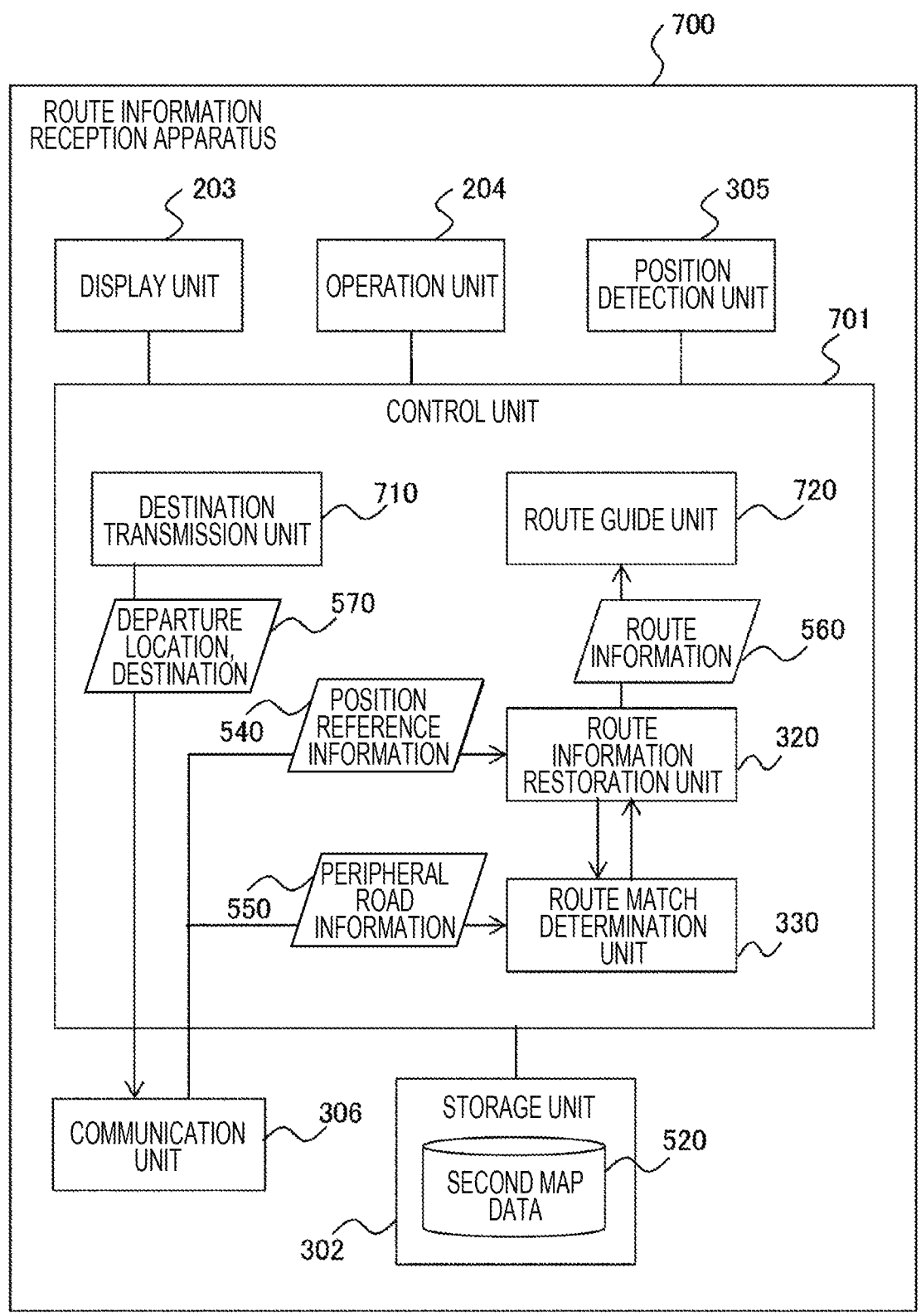
FIG. 23 is a configuration diagram of a route information reception apparatus according to the second embodiment.

FIG. 23 is a configuration diagram of the route information reception apparatus 700. The route information reception apparatus 700 includes a control unit 701, the storage unit 302, the display unit 203, the operation unit 204, the position detection unit 305, and the communication unit 306. Incidentally, the storage unit 302, the position detection unit 305, and the communication unit 306 are similar to those described in the first embodiment, respectively, and the storage unit 302 stores the second map data 520 which is map data for navigation.

The display unit 203 displays various types of information including the second map data 520 as the information for the car navigation system. The operation unit 204 receives various operations of a user including a destination setting operation for setting of a destination of a route along which the vehicle 100 needs to travel. The display unit 203 and the operation unit 204 are configured using, for example, a touch panel type liquid crystal display or the like.

The control unit 701 performs a series of processes of the route information reception apparatus 700 serving as the car navigation system, and is constituted by a CPU, a ROM, a RAM, and the like. The control unit 701 has functional blocks of the route information restoration unit 320, the route match determination unit 330, a destination transmission unit 710, and a route guide unit 720. These functional blocks are functions to be realized as software modules as the CPU executes predetermined programs. Alternatively, these functional blocks may be realized as dedicated hardware.

The route information restoration unit 320 restores route information 560 indicating a route of the vehicle 100 on the second map data 520 from the position reference information 540 transmitted from the route information transmission apparatus 600, which is similar to the first embodiment.

The route match determination unit 330 refers to the peripheral road information 550 transmitted from the route information transmission apparatus 600 to determine whether the search result of the route on the first map data 510 indicated by the position reference information 540 and the route information 560 on the second map data 520 restored by the route information restoration unit 320 match each other, which is similar to the first embodiment.

The destination transmission unit 710 transmits information indicating the destination of the vehicle 100 set according to an input operation of a user via the operation unit 204 and a departure location of the vehicle 100 set according to a current position detected by the position detection unit 305 to the route information transmission apparatus 600 via the communication unit 306 as the route search information 570.

The route guide unit 720 refers to the route information 560 restored by the route information restoration unit 320 to perform route guide of the vehicle 100 based on the second map data 520. The route guide of the vehicle 100 is performed, for example, by displaying a map based on the second map data 520 on the display unit 203 and indicating the route on this map. As a result, the vehicle 100 is correctly guided from the departure location to the destination based on the route transmitted from the route information transmission apparatus 600 and the second map data 520.

The communication unit 306 communicates with the route information transmission apparatus 600 via the communication network 120. The route search information 570, set via the operation unit 204 and output from the destination transmission unit 710, is transmitted from the route information reception apparatus 700 to the route information transmission apparatus 600 through the communication performed by the communication unit 306. In addition, the position reference information 540 and the peripheral road information 550 transmitted from the route information transmission apparatus 600 are received by the route information reception apparatus 700.

As described above, the route information reception apparatus 700 according to the present embodiment is different from the route information reception apparatus 300 described in the first embodiment in terms of including the display unit 203, the operation unit 204, the destination transmission unit 710, and the route guide unit 720.

Figure 24:
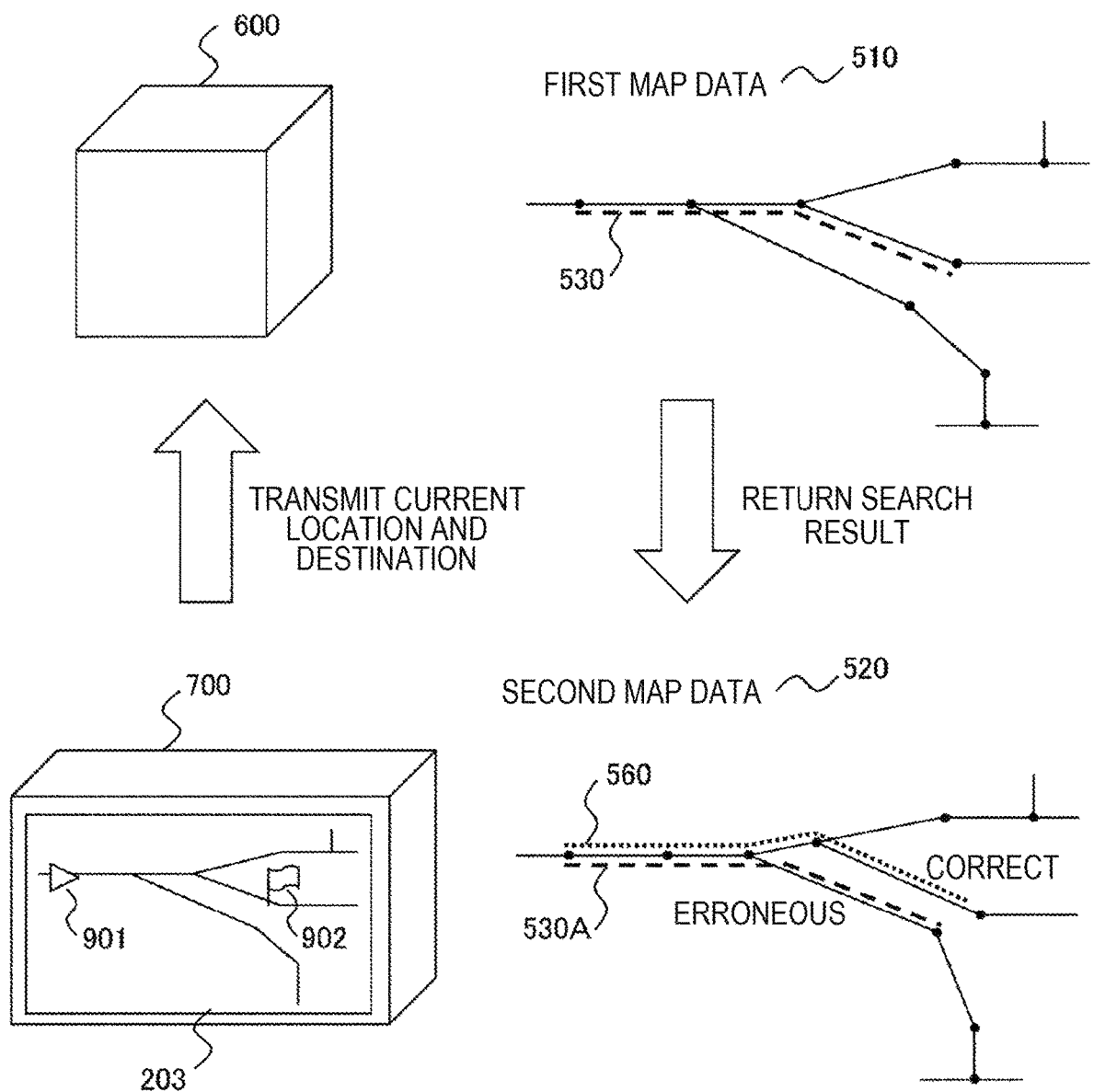
FIG. 24 is a view for describing an operation outline of the center-generated route distribution system according to the second embodiment.

FIG. 24 is a view for describing an operation outline of the center-generated route distribution system according to the present embodiment. As illustrated in the lower left part of FIG. 24, the current location 901, and the destination 902 are displayed on the road represented by the second map data 520 on the display unit 203 of the route information reception apparatus 700 The route information reception apparatus 700 transmits the information indicating the current location 901 and the destination 902 to the route information transmission apparatus 600 as the route search information 570.

When receiving the route search information 570 from the route information reception apparatus 700, the route information transmission apparatus 600 refers to the first map data 510 to search for a route that reaches the destination 902 from the current location 901 and generate the search result 530 of this route. Further, the position reference information 540 and the peripheral road information 550 are returned to the route information reception apparatus 700 as the information indicating the generated search result 530.

When receiving the position reference information 540 and the peripheral road information 550 from the route information transmission apparatus 600, the route information reception apparatus 700 selects a road corresponding to the search result 530 in the second map data 520 as illustrated in the lower right part of FIG. 24 in order to perform the route guide along the road indicated by the search result 530. Here, there is a case where a route 530A on the second map data is selected when a road whose attributes and road coordinates are the most similar to the search result 530 is simply selected as described in the first embodiment. However, since the search result 530 on the first map data 510 and the route 530A on the second map data 520 are different roads as understood from FIG. 24, the above-described selection becomes an error. Thus, the search result 530 is converted into the route information 560 by the same means as in the first embodiment so that the route guide of the vehicle 100 is performed according to the correct route indicated by the route information 560 in the present embodiment.

Incidentally, details of the first map data 510 and the second map data 520 in the present embodiment are similar to those in the first embodiment. In addition, details of processes of the route search unit 220, the position reference information generation unit 230, and the peripheral road information generation unit 240 in the route information transmission apparatus 600 to realize the operations illustrated in FIG. 24, and details of processes of the route information restoration unit 320 and the route match determination unit 330 in the route information reception apparatus 700 are also similar to those in the first embodiment. With the above configuration, it is possible to execute the navigation along the route created using different types of map data.

According to the second embodiment of the present invention described above, the following operational effect is further achieved in addition to the effects of (1) to (8), and (10) described in the first embodiment.

(12) In the route information transmission apparatus 600, the communication unit 206 receives the route search information 570 indicating the current location and the destination from the route information reception apparatus 700, and the route search unit 220 generates the search result 530 based on the route search information 570 received by the communication unit 206. In this manner, the current location and the destination of the vehicle 100 on which the route information reception apparatus 700 is mounted are reliably collected by the route information transmission apparatus 600, and it is possible to search for the route corresponding to these pieces of information.

(13) The route information reception apparatus 700 further includes the display unit 203 that displays the information including the second map data 520 and the operation unit 204 that receives the operation to set the destination of the route. The communication unit 306 transmits the route search information 570 indicating the destination set based on the operation on the operation unit 204 to the route information transmission apparatus 600. In this manner, a user can easily set an arbitrary destination and allow the route information transmission apparatus 600 to search the route to the destination.

The above-described embodiments are merely examples, and the present invention is not limited to these contents unless the features of the invention are impaired. In addition, various embodiments have been described as above, but the present invention is not limited to these contents. Other aspects conceivable within a technical idea of the present invention are also included within the scope of the present invention.

The disclosed content of the following priority application is incorporated herein as the citation.

Japanese Patent Application No. 2016-117676 (filed on Jun. 14, 2016)

REFERENCE SIGNS LIST 100 vehicle
110 center system
120 communication network
200 route information transmission apparatus
201 control unit
202 storage unit
203 display unit
204 operation unit
205 position detection unit
206 communication unit
210 destination setting unit
220 route search unit
230 position reference information generation unit
240 peripheral road information generation unit
300 route information reception apparatus
301 control unit
302 storage unit
305 position detection unit
306 communication unit
307 second communication unit
320 route information restoration unit
330 route match determination unit
400 vehicle control ECU
410 sensor
420 actuator
510 first map data
520 second map data
530 search result
540 position reference information
550 peripheral road information
560 route information
570 route search information
600 route information transmission apparatus
601 control unit
700 route information reception apparatus
701 control unit
710 destination transmission unit
720 route guide unit
901 current location
902 destination

The invention claimed is:

1. A route information conversion system comprising:
a route information transmission apparatus; and
a route information reception apparatus,
wherein the route information transmission apparatus comprises a first memory coupled to a first processor, the first memory storing instructions, that when executed by the first processor, configure the first processor to:
    generate a search result of a route search with reference to first map data;
    generate position reference information indicating a road corresponding to the search result; and
    generate peripheral road information indicating a road branching from the road corresponding to the search result and being different from the road corresponding to the search result, and
the route information reception apparatus comprises a second memory coupled to a second processor, the second memory storing instructions, that when executed by the second processor, configure the second processor to:
    restore route information on second map data from the position reference information; and
    determine whether the search result on the first map data and the route information on the second map data match each other with reference to the peripheral road information,
wherein the peripheral road information includes information indicating coordinates and attributes of one or more road links constituting a branch road which branches from the route and intersects with another road that is different from the route in the first map data, wherein the second processor is further configured to compare the peripheral road information with the second map data to determine whether the search result on the first map data and the route information on the second map data match each other, wherein the position reference information includes information indicating presence or absence of a first branch road branching from the route in the first map data, and wherein the second processor is further configured to:

restore the route information on the second map data by selecting a candidate link corresponding to the route in the second map data, determine presence or absence of the first branch road based on the position reference information and determine presence or absence of a second branch road branching from the candidate link based on the second map data, determine presence of at least one road link of the second map data existing within a predetermined radius R of a circular area from the first branch road; and determine absence of the at least one road link of the second map data within the predetermined radius R of a circular area from the first branch road and as a result confirm that the at least one road link of the second map data and the first branch road are the same link;

determine presence of the at least one road link of the first map data within the predetermined radius R of a circular area from the second branch road; and determine absence of the at least one road link of the first map data within the radius of the predetermined threshold R from the second branch road and as a result confirm that the at least one road link of the first map data and the second branch road are the same link.

2. The route information conversion system according to claim 1, wherein the position reference information includes information indicating coordinates and attributes of one or more road links constituting the route in the first map data, and wherein the second processor is further configured to compare restore route information on the second map data by selecting a road link having coordinates and attributes similar to coordinates and attributes, respectively, indicated by the position reference information in the second map data.

3. The route information conversion system according to claim 1, wherein the peripheral road information includes at least information indicating coordinates and attributes of a road link connected to an intersection point between the branch road and the other road in the first map data.

4. The route information conversion system according to claim 1, wherein the second processor is further configured to:

calculate a shortest distance between the first branch road and the second branch road based on the peripheral road information when it is determined that both the first branch road and the second branch road are present, and determine whether the road link constituting the route in the first map data and the candidate link match each other based on the calculated shortest distance.

5. The route information conversion system according to claim 1, wherein the second processor is further configured to:

determine that the road link constituting the route in the first map data and the candidate link match each other when it is determined that neither the first branch road nor the second branch road is present.

6. A route information transmission apparatus connected to a route information reception apparatus via a communication network, the route information transmission apparatus comprising:

a memory coupled to a processor, the memory storing instructions, that when executed by the first processor, configure the processor to:

generate a search result of a route search with reference to first map data;

generate position reference information indicating a road corresponding to the search result;

generate peripheral road information indicating a road branching from the road corresponding to the search result and being different from the road corresponding to the search result; and a communication interface connectable to the communication network that transmits the position reference information and the peripheral road information to the route information reception apparatus, wherein the peripheral road information includes information indicating coordinates and attributes of one or more road links constituting a branch road which branches from the route and intersects with another road that is different from the route in the first map data, wherein the second processor is further configured to compare the peripheral road information with the second map data to determine whether the search result on the first map data and the route information on the second map data match each other, wherein the position reference information includes information indicating presence or absence of a first branch road branching from the route in the first map data, and wherein the second processor is further configured to:

restore the route information on the second map data by selecting a candidate link corresponding to the route in the second map data, determine presence or absence of the first branch road based on the position reference information and determine presence or absence of a second branch road branching from the candidate link based on the second map data, determine presence of at least one road link of the second map data existing within a predetermined radius R of a circular area from the first branch road; and determine absence of the at least one road link of the second map data within the predetermined radius R of a circular area from the first branch road and as a result confirm that the at least one road link of the second map data and the first branch road are the same link;

determine presence of the at least one road link of the first map data within the predetermined radius R of a circular area from the second branch road; and determine absence of the at least one road link of the first map data within the radius of the predetermined threshold R from the second branch road and as a result confirm that the at least one road link of the first map data and the second branch road are the same link.

7. The route information transmission apparatus according to claim 6 further comprising:

a display that displays information including the first map data; and an operation interface that receives an operation to set a destination of the route, wherein the processor is further configured to:

receive the destination of the route based on the operation on the operation interface to the route search unit, and generate the search result based on the destination of the route that is input.

8. The route information transmission apparatus according to claim 7, wherein the communication interface receives a current location and a destination from the route information reception apparatus, and the processor is further configured to:

generate the search result based on the current location and the destination received by the communication interface.

9. A route information reception apparatus connected to a route information transmission apparatus via a communication network, the route information reception apparatus comprising:

a communication interface that receives position reference information indicating a search result of a route in first map data and peripheral road information indicating a road branching from the route and being different from the road corresponding to the search result from the route information transmission apparatus; and a memory coupled to a processor, the memory storing instructions, that when executed by the processor, configure the processor to:

restore route information on second map data from the position reference information; and determine whether the search result on the first map data and the route information on the second map data match each other with reference to the peripheral road information, wherein the peripheral road information includes information indicating coordinates and attributes of one or more road links constituting a branch road which branches from the route and intersects with another road that is different from the route in the first map data, wherein the processor is further configured to compare the peripheral road information with the second map data to determine whether the search result on the first map data and the route information on the second map data match each other, wherein the position reference information includes information indicating presence or absence of a first branch road branching from the route in the first map data, and wherein the processor is further configured to:

restore the route information on the second map data by selecting a candidate link corresponding to the route in the second map data, determine presence or absence of the first branch road based on the position reference information and determine presence or absence of a second branch road branching from the candidate link based on the second map data, determine presence of at least one road link of the second map data existing within a predetermined radius R of a circular area from the first branch road; and determine absence of the at least one road link of the second map data within the predetermined radius R of a circular area from the first branch road and as a result confirm that the at least one road link of the second map data and the first branch road are the same link;

determine presence of the at least one road link of the first map data within the predetermined radius R of a circular area from the second branch road; and determine absence of the at least one road link of the first map data within the radius of the predetermined threshold R from the second branch road and as a result confirm that the at least one road link of the first map data and the second branch road are the same link.

10. The route information reception apparatus according to claim 9 further comprising a second communication interface that transmits the restored route information.

11. The route information reception apparatus according to claim 9 further comprising:

a display that displays information including the second map data; and an operation interface which receives an operation to set a destination of the route, wherein the communication interface transmits the destination of the route based on the operation on the operation interface to the route information transmission apparatus.

* * * * *